(12) United States Patent
Sasaki et al.

(10) Patent No.: US 10,713,147 B2
(45) Date of Patent: Jul. 14, 2020

(54) TEST APPARATUS AND METHOD IMPLEMENTING INSTRUCTION REQUEST COMMAND FOR TESTING COMPUTING MACHINE RESOURCES

(71) Applicant: FUJITSU LIMITED, Kawasaki-shi, Kanagawa (JP)

(72) Inventors: Yusuke Sasaki, Kawasaki (JP); Masaru Ueno, Kawasaki (JP); Atsuji Sekiguchi, Kawasaki (JP); Kosaku Kimura, Kawasaki (JP); Shridhar Choudhary, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 144 days.

(21) Appl. No.: 15/935,096

(22) Filed: Mar. 26, 2018

(65) Prior Publication Data

US 2018/0285245 A1    Oct. 4, 2018

(30) Foreign Application Priority Data

Mar. 28, 2017 (JP) .................... 2017-062954

(51) Int. Cl.
*G06F 11/00* (2006.01)
*G06F 11/36* (2006.01)
*G06F 9/455* (2018.01)

(52) U.S. Cl.
CPC ...... *G06F 11/3664* (2013.01); *G06F 9/45558* (2013.01); *G06F 11/3672* (2013.01);
(Continued)

(58) Field of Classification Search
CPC .................. G06F 11/3624; G05B 2219/23283
See application file for complete search history.

(56) References Cited

U.S. PATENT DOCUMENTS 7,653,899 B1 * 1/2010 Lindahl ............... G06F 11/3612
717/125
2004/0040013 A1   2/2004 Kalra
(Continued)

FOREIGN PATENT DOCUMENTS

| JP | 2004-086910 | 3/2004 |
| JP | 2005-352591 | 12/2005 |
| JP | 2008-217473 | 9/2008 |

*Primary Examiner* — Christopher S. McCarthy
(74) *Attorney, Agent, or Firm* — Fujitsu Patent Center

(57) ABSTRACT

An apparatus tests specific processing performed by plural computing machine resources provided by one or plural computers. The apparatus adds an instruction request command to request an instruction from the apparatus at a predetermined position in a source code of the specific processing performed by each computing machine resource, and generates the source code with an additional command. In response to execution of the instruction request command in one of the plural computing machine resources during execution of the specific processing, the apparatus refers to the memory that stores instruction information by which the instruction request command added to the source code with the additional command executed by each computing machine resource is associated with processing performed by the computing machine resource, and instructs the one of the plural computing machine resources which has executed the instruction request command to perform the processing corresponding to the executed instruction request command.

10 Claims, 28 Drawing Sheets

(52) U.S. Cl.
CPC .............. *G06F 2009/45575* (2013.01); *G06F 2009/45591* (2013.01)

(56) References Cited

U.S. PATENT DOCUMENTS

| | | | |
|---|---|---|---|
| 2013/0055217 A1* | 2/2013 | Boxall ................ | G06F 11/3624 717/129 |
| 2016/0140027 A1* | 5/2016 | Ug ...................... | G06F 11/3688 717/129 |
| 2016/0188440 A1* | 6/2016 | Bates .................. | G06F 11/3624 717/129 |

* cited by examiner

FIG. 18A

```
If (listen_31) { Exit(1); }
Logic_A
If (listen_32) { Exit(2); }
Logic_B
If (listen_33) { Exit(3); }
Logic_C, write new data
If (listen_34) { Exit(4); }
Logic_D
If (listen_35) { Exit(5); }
```
232a

FIG. 18B

```
If (listen_41) { Exit(1); }
Logic_E, read all data
If (listen_42) { Exit(2); }
```
232b

FIG. 19

| ITEM NUMBER | DATE AND TIME | VIRTUAL MACHINE GROUP | VIRTUAL MACHINE | NOTIFICATION POSITION | PROCESSING STATE |
|---|---|---|---|---|---|
| 1 | 2/7/2017 13:45:01 | MG3 | VM33 | 1 | RE-START |
| 2 | 2/7/2017 13:45:02 | MG3 | VM33 | 2 | SHUT-DOWN |
| 3 | 2/7/2017 13:45:02 | MG3 | VM34 | 1 | RE-START |
| 4 | 2/7/2017 13:45:02 | MG3 | VM34 | 2 | RE-START |
| 5 | 2/7/2017 13:45:03 | MG3 | VM34 | 3 | RE-START |
| 6 | 2/7/2017 13:45:03 | MG3 | VM34 | 4 | SHUT-DOWN |
| 7 | 2/7/2017 13:45:04 | MG3 | VM35 | 1 | RE-START |
| 8 | 2/7/2017 13:45:05 | MG3 | VM35 | 2 | RE-START |
| 9 | 2/7/2017 13:45:06 | MG3 | VM35 | 3 | RE-START |
| 10 | 2/7/2017 13:45:07 | MG3 | VM35 | 4 | RE-START |
| 11 | 2/7/2017 13:45:07 | MG3 | VM35 | 5 | RE-START |
| 12 | 2/7/2017 13:45:07 | MG4 | VM36 | 1 | RE-START |
| 13 | 2/7/2017 13:45:08 | MG4 | VM36 | 2 | RE-START |

FIG. 20

| ITEM NUMBER | DATE AND TIME | VIRTUAL MACHINE GROUP | VIRTUAL MACHINE | NOTIFICATION POSITION | PROCESSING STATE |
|---|---|---|---|---|---|
| 1 | 2/7/2017 13:45:01 | MG3 | VM33 | 1 | RE-START |
| 2 | 2/7/2017 13:45:02 | MG3 | VM33 | 2 | SHUT-DOWN |
| 3 | 2/7/2017 13:45:02 | MG3 | VM34 | 1 | RE-START |
| 6 | 2/7/2017 13:45:03 | MG3 | VM34 | 4 | SHUT-DOWN |
| 7 | 2/7/2017 13:45:04 | MG3 | VM35 | 1 | RE-START |
| 11 | 2/7/2017 13:45:07 | MG3 | VM35 | 5 | RE-START |
| 12 | 2/7/2017 13:45:07 | MG4 | VM36 | 1 | RE-START |
| 13 | 2/7/2017 13:45:08 | MG4 | VM36 | 2 | RE-START |

FIG. 21

| ITEM NUMBER | VIRTUAL MACHINE GROUP | NOTIFICATION POSITION | INSTRUCTION | CONDITION |
| --- | --- | --- | --- | --- |
| 1 | MG3 | 2 | SHUT-DOWN | NONE |
| 2 | MG3 | 1 | RE-START | 1 |
| 3 | MG3 | 4 | SHUT-DOWN | NONE |
| 4 | MG3 | 1 | RE-START | 3 |
| 5 | MG3 | 5 | RE-START | NONE |
| 6 | MG4 | 1 | RE-START | 5 |

TEST APPARATUS AND METHOD IMPLEMENTING INSTRUCTION REQUEST COMMAND FOR TESTING COMPUTING MACHINE RESOURCES

CROSS-REFERENCE TO RELATED APPLICATIONS

This application is based upon and claims the benefit of priority of the prior Japanese Patent Application No. 2017-62954, filed on Mar. 28, 2017, the entire contents of which are incorporated herein by reference.

FIELD

The embodiment discussed herein is related to a test apparatus and a test method therefor.

BACKGROUND

For instance, a business enterprise that provides services for users (hereinafter also simply called a business enterprise) constructs and operates a business system for providing services (hereinafter also called an information processing system). For instance, when generating a program that implements a business system, the business enterprise conducts various tests for the operation of the generated program.

Specifically, when the business system includes a plurality of computing machine resources (for instance, a plurality of virtual machines generated on a physical machine) provided by one or a plurality of computers, the business enterprise conducts a test for processing which is performed by the plurality of computing machine resources in coordination with each other. Thus, after the start of service provision to users, the business enterprise may reduce the occurrence of a failure that affects the service provision (see, for example, Japanese Laid-open Patent Publication Nos. 2004-086910, 2005-352591, and 2008-217473).

SUMMARY

According to an aspect of the invention, an apparatus tests specific processing performed by a plurality of computing machine resources in coordination with each other, the computing machine resources provided by one or a plurality of computers. The apparatus adds an instruction request command to request an instruction from the test apparatus at a predetermined position in a source code of the specific processing performed by each of the plurality of computing machine resources, and generates the source code with an additional command. In response to execution of the instruction request command in one of the plurality of computing machine resources during execution of the specific processing, the apparatus refers to the memory that stores instruction information by which the instruction request command added to the source code with the additional command executed by each of the plurality of computing machine resources is associated with processing performed by the computing machine resource, and instructs the one of the plurality of computing machine resources which has executed the instruction request command to perform the processing corresponding to the executed instruction request command, The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 18A and 18B are each a chart illustrating a specific example source code with additional command;

FIG. 19 is a table illustrating specific example log information;

FIG. 20 is a table illustrating details of processing in S33;

FIG. 21 is a table illustrating specific example instruction information;

DESCRIPTION OF EMBODIMENT

For instance, when a computing machine resource is shut-down due to occurrence of a failure or the like, in the above-mentioned business system, the processing which has been performed by the shut-down computing machine resource is taken over by another computing machine resource. Therefore, when a business enterprise tests the above-mentioned business system, the business enterprise has to test the business system in the case where a shut-down computing machine resource occurs.

However, for instance, when the number of computing machine resources included in a business system is huge, it is not possible for the business enterprise to comprehensively test the business system in the case where processing of each computing machine resource is shut-down.

Therefore, the business enterprise determines, for instance, a computing machine resource to be shut-down at random among the computing machine resources included in a business system, and tests the business system when the processing of the determined computing machine resource is shut-down. Thus, the business enterprise may detect an abnormality in a range the test may be conducted.

However, in this case, it is not possible for the business enterprise to identify the conditions (for instance, a timing of shut-down of a computing machine resource) under which the test was conducted after the test. Therefore, even when presence of abnormality is detected by conducting the test, it is not possible for the business enterprise to reproduce the same state, and thus to thoroughly perform investigation of the detected abnormality.

It is preferable to reproduce states in which a test was conducted in the past.

[Configuration of Information Processing System]

Figure 1:
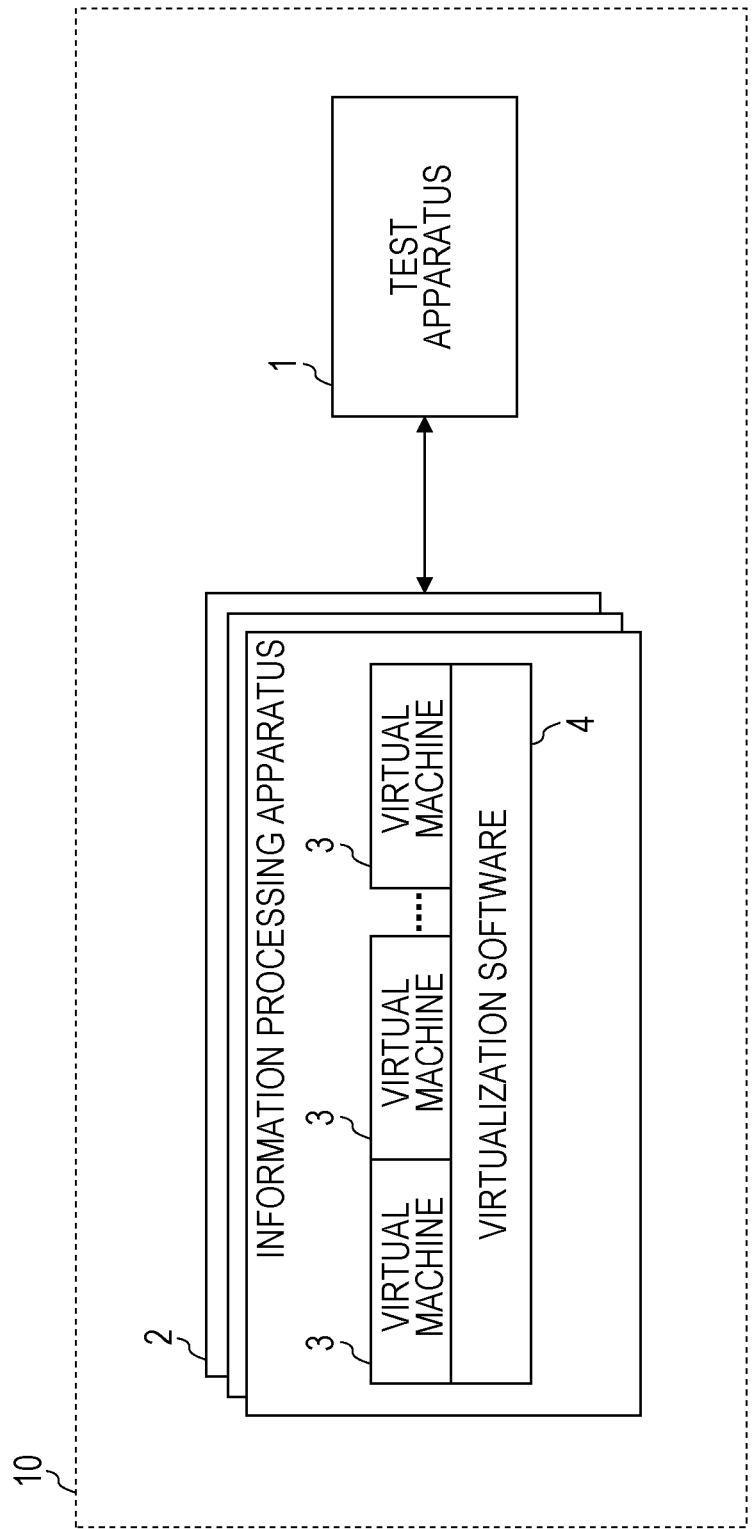
FIG. 1 is a diagram illustrating a configuration of an information processing system.

FIG. 1 is a diagram illustrating the entire configuration of an information processing system 10. The information processing system 10 illustrated in FIG. 1 has a test apparatus 1 and an information processing apparatus 2.

The information processing apparatus 2 includes, for instance, a plurality of physical machines. Each of the physical machines has a central processing unit (CPU), a memory (dynamic random access memory (DRAM)), and a hard disk (hard disk drive (HDD)). The physical resources of each physical machine are allocated to a virtual machine 3 that provides services to users.

The test apparatus 1 includes, for instance, one or more physical machines. The test apparatus 1 tests the operation of virtual machines 3 generated on the information processing apparatus 2. It is to be noted that the test apparatus 1 may include the virtual machines 3.

Virtualization software 4 is infrastructure software that, in response to an instruction from a management apparatus (not illustrated) that manages the virtual machines 3, operates the virtual machines 3 by assigning the CPU, the memory, the hard disk and the like of the information processing apparatus 2 to the virtual machines 3. The virtualization software 4 is operated, for instance, on the information processing apparatus 2.

[Specific Example Operation of Virtual Machines 3]

Figure 2:
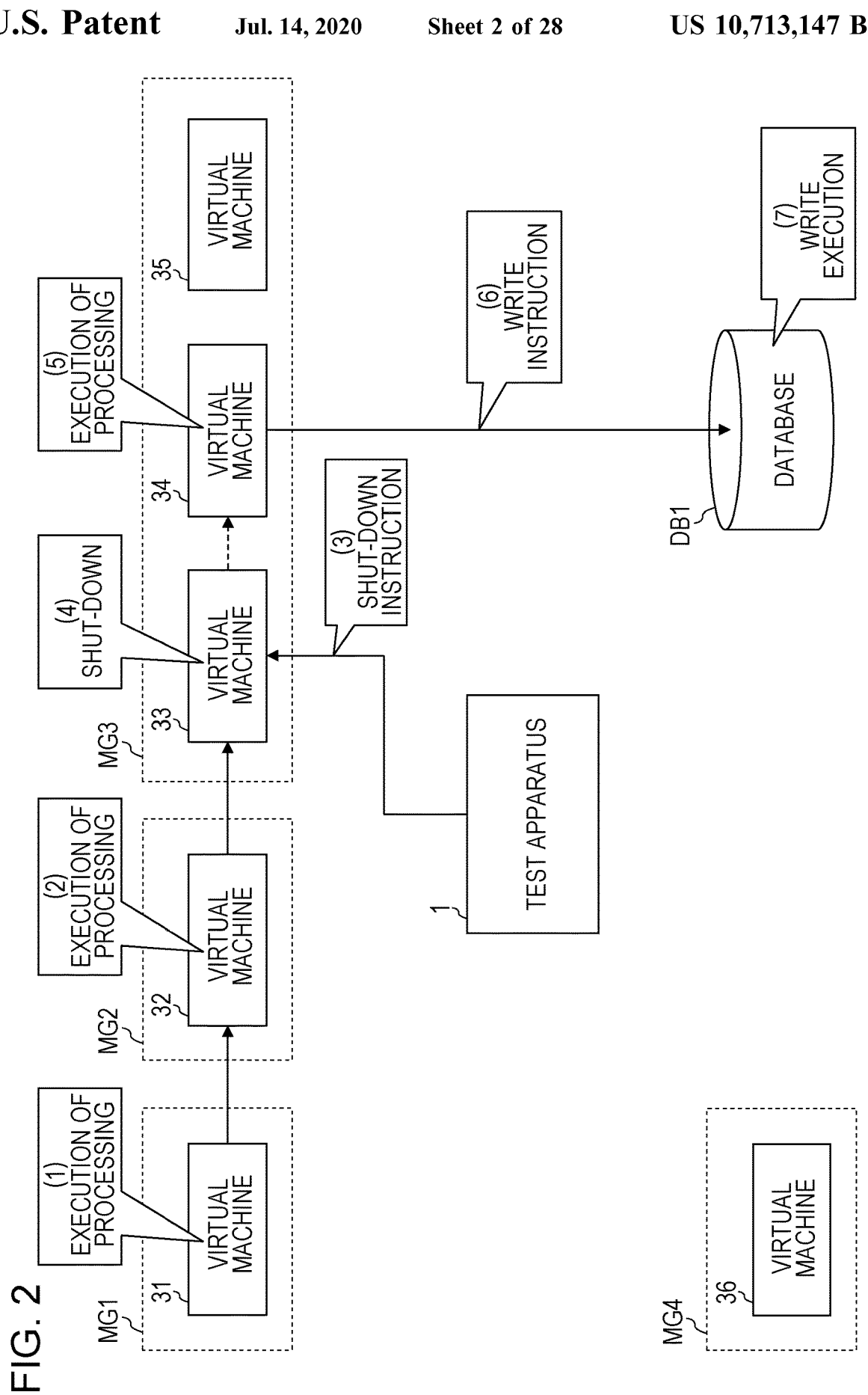
FIG. 2 is a diagram illustrating a specific example operation of each virtual machine.
Figure 3:
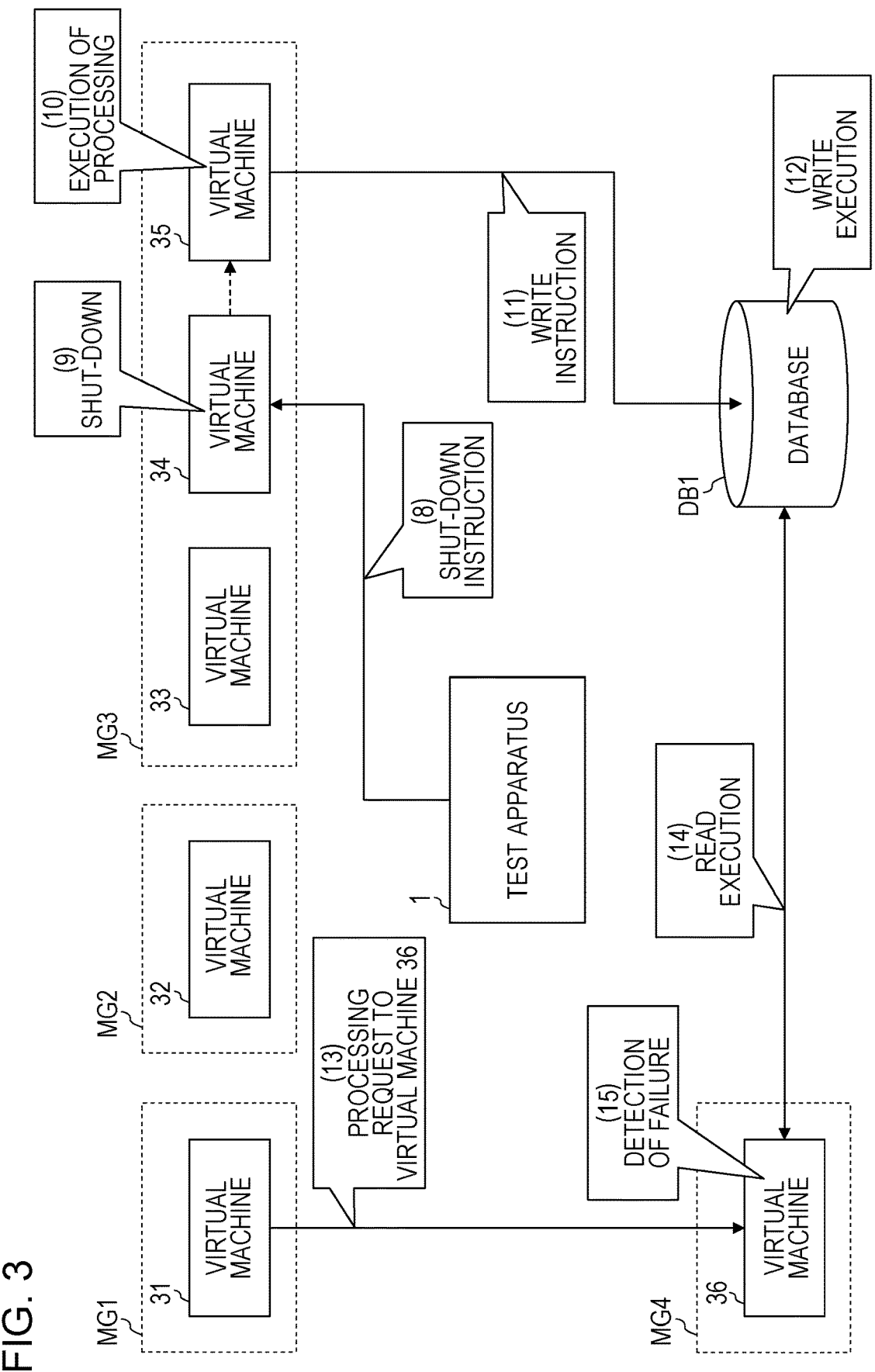
FIG. 3 is a diagram illustrating a specific example operation of each virtual machine.

Next, a specific example operation of the virtual machines 3 will be described. FIGS. 2 and 3 are each a diagram illustrating a specific example operation of the virtual machines 3.

In the example illustrated in FIGS. 2 and 3, a virtual machine 31 included in a virtual machine group MG1, a virtual machine 32 included in a virtual machine group MG2, virtual machines 33, 34, and 35 included in a virtual machine group MG3, and a virtual machine 36 included in a virtual machine group MG4 perform test object processing (hereinafter also called specific processing) in coordination with each other. Hereinafter, the virtual machines 31, 32, 33, 34, 35, and 36 are also collectively called the virtual machine 3.

In the example illustrated in FIGS. 2 and 3, each virtual machine 3 included in the same virtual machine group performs the same processing. Therefore, for instance, when another virtual machine included in the same virtual machine group is shut-down due to occurrence of a failure or the like, each virtual machine 3 may take over and perform the processing which has been performed by the shut-down virtual machine. Specifically, for instance, when occurrence of shut-down of a virtual machine 3 is detected, the management apparatus (not illustrated) of each virtual machine 3 causes another virtual machine included in the same virtual machine group which includes the shut-downed virtual machine 3 to perform the processing which has been performed by the shut-down virtual machine 3.

In addition, the test apparatus 1 in the example illustrated in FIGS. 2 and 3 instructs a virtual machine 3 to shut-down at random.

Specifically, as illustrated in FIG. 2, for instance, when the virtual machine 31 receives data from a client terminal (not illustrated) which receives an instruction from the test apparatus 1, the virtual machine 31 starts processing based on the received data ((1) in FIG. 2). When the virtual machine 32 receives data, for instance, from the virtual machine 31 which has started the processing, the virtual machine 32 starts processing based on the received data ((2) in FIG. 2). Similarly, when the virtual machine 33 receives data, for instance, from the virtual machine 32 which has started the processing, the virtual machine 33 starts processing based on the received data.

Subsequently, the test apparatus 1 transmits a shut-down instruction to the virtual machine 33, for instance, while the virtual machine 33 is performing the processing ((3) in FIG. 2). In response to the shut-down instruction transmitted from the test apparatus 1, the virtual machine 33 shuts down the virtual machine 33 itself ((4) in FIG. 2).

Subsequently, the virtual machine 34 takes over and starts the processing which has been performed by the virtual machine 33, and transmits a data write instruction to a database DB1, for instance ((5) and (6) in FIG. 2). The database DB1 then writes data according to the contents of the write instruction received from the virtual machine 34 ((7) in FIG. 2).

Furthermore, as illustrated in FIG. 3, for instance, while the virtual machine 34 is performing the processing, the test apparatus 1 transmits a shut-down instruction to the virtual machine 34 ((8) in FIG. 3). In response to receiving the shut-down instruction transmitted from the test apparatus 1, the virtual machine 34 shuts down the virtual machine 34 itself ((9) in FIG. 3).

Subsequently, the virtual machine 35 take overs and starts the processing which has been performed by the virtual machine 34, and transmits a data write instruction to the database DB1, for instance ((10) and (11) in FIG. 3). The database DB1 then writes data according to the contents of the write instruction received from the virtual machine 35 ((12) in FIG. 3).

Subsequently, the virtual machine 31 transmits a processing request to the virtual machine 36, for instance, in connection with execution of the processing based on data received from a client terminal ((13) in FIG. 3). In response to receiving the processing request transmitted from the virtual machine 31, the virtual machine 36 reads data stored in the database DB1 according to the contents of the received processing request ((14) in FIG. 3).

Here, in the example illustrated in FIGS. 2 and 3, the virtual machine 34 and the virtual machine 35 each write data to the database DB1. Thus, for instance, when writing performed by both the virtual machine 34 and the virtual machine 35 is redundantly performed due to occurrence of shut-down of the virtual machine 34, abnormality such as inconsistency of data occurs in the database DB1. Thus, the virtual machine 36, which has read data stored in the database DB1, detects occurrence of abnormality in the database DB1, for instance, and transmits a notification to the test apparatus 1, the notification indicating the occurrence of abnormality in connection with execution of the test object processing ((15) in FIG. 3).

In this manner, the test apparatus 1 may detect an abnormality present in the virtual machine 3, for instance, by shutting down the virtual machine 3 which is performing the test object processing. Consequently, after the start of service provision to users, the business enterprise may reduce the occurrence of a failure that affects the service provision.

However, when a test is conducted, in which a virtual machine 3 to be shut-down is determined at random as described above, the business enterprise may not identify the conditions (for instance, a timing of shut-down of the virtual machine 3) under which the test was conducted after the test. Therefore, even when presence of abnormality is detected by conducting the test, the business enterprise may not reproduce the same state, and thus investigation of the detected abnormality may not be performed thoroughly.

Thus, the test apparatus 1 adds an instruction request command to request an instruction from the test apparatus 1 at a predetermined position in the source code of the test object processing to be performed by each of a plurality of virtual machines 3, and generates a source code with additional command.

Also, in response to execution of an instruction request command in one of the virtual machines 3 during execution of the test object processing, the test apparatus 1 refers to a memory unit that stores instruction information by which each of the instruction request commands added to the source code with additional command executed by the virtual machines 3 is associated with processing performed by a corresponding one of the virtual machines 3. The test apparatus 1 then instructs the one virtual machine 3 which has executed the instruction request command to perform the processing corresponding to the executed instruction request command.

In other words, the test apparatus 1 in this embodiment conducts the test while shutting down a virtual machine 3 in accordance with, for instance, information on the virtual machines 3 and information indicating the timing of shut-down of the virtual machines 3 included in the instruction information prepared in advance.

Thus, when detecting an abnormality by conducting the test, the test apparatus 1 may reproduce the detected abnormality by conducting the test again with reference to the instruction information. Consequently, the test apparatus 1 may thoroughly perform investigation of the detected abnormality in the test.

[Hardware Configuration of Information Processing System]

Figure 4:
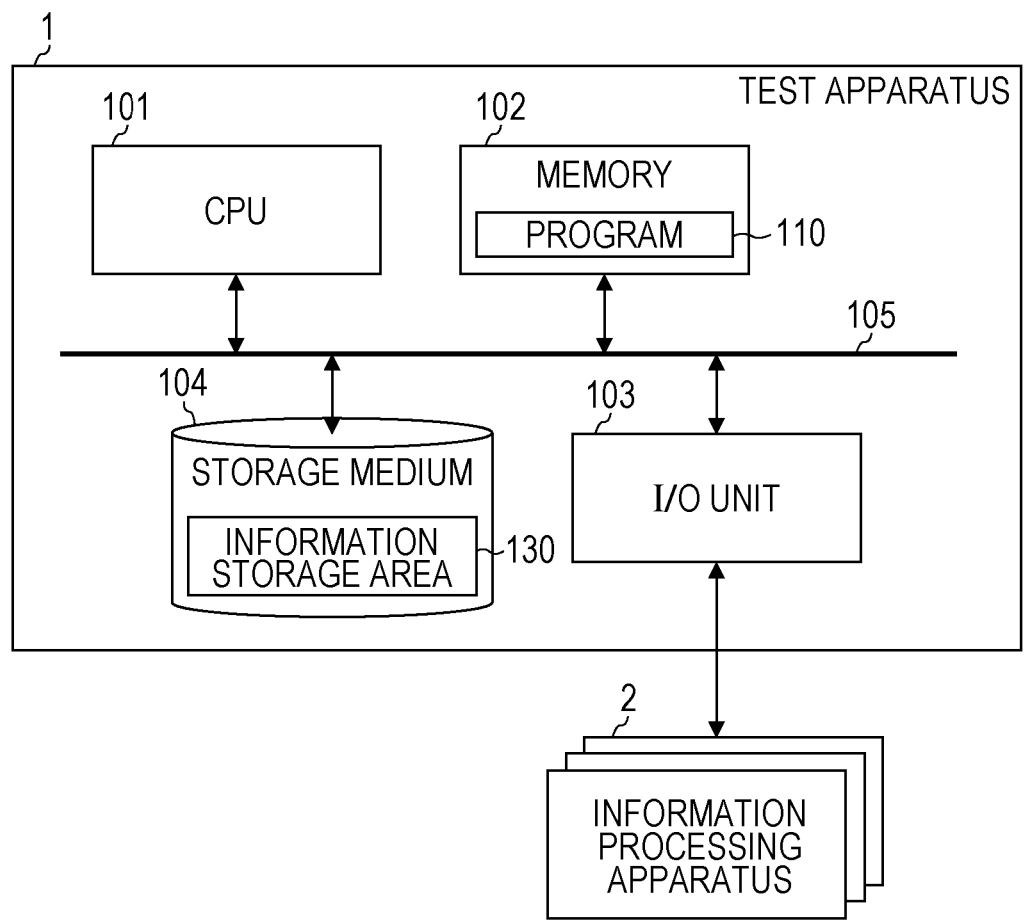
FIG. 4 is a diagram illustrating a hardware configuration of a test apparatus.
Figure 5:
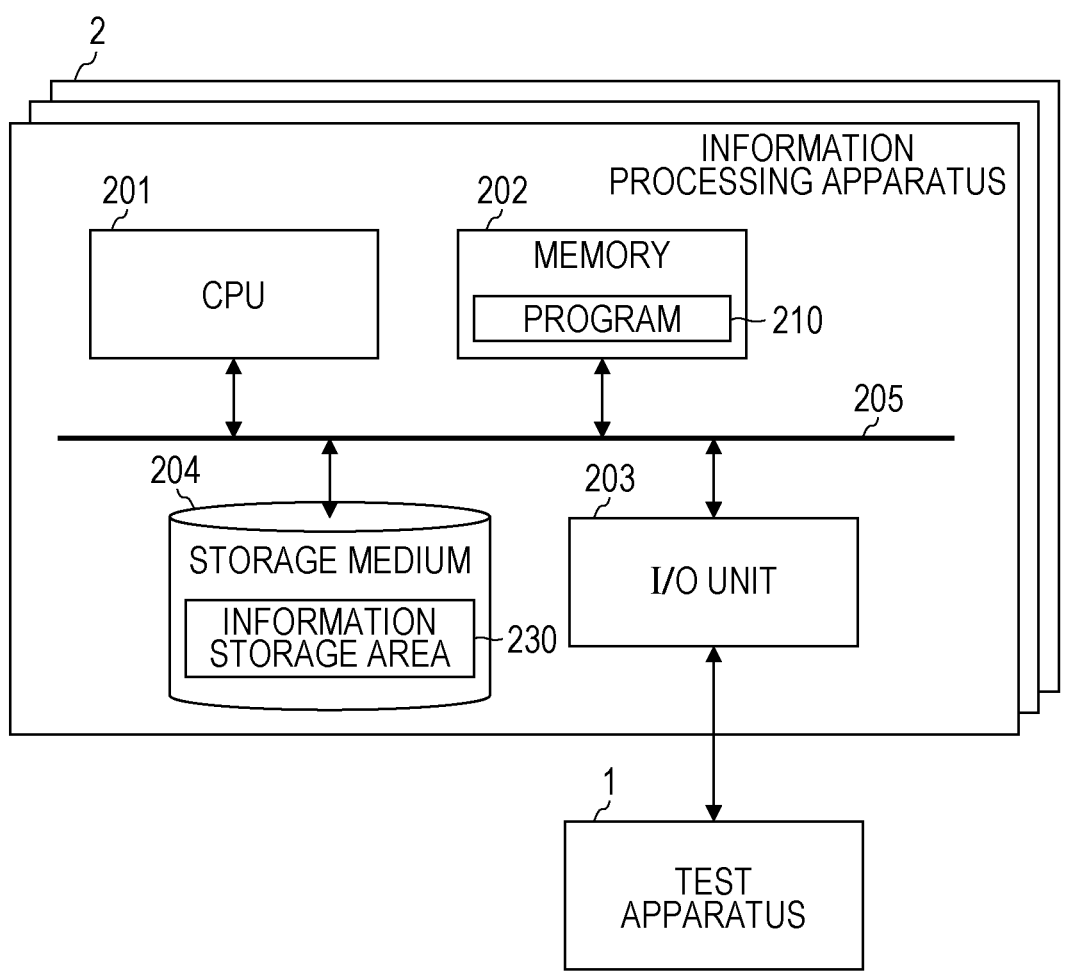
FIG. 5 is a diagram illustrating the hardware configuration of an information processing apparatus.

Next, the hardware configuration of the information processing system 10 will be described. FIG. 4 is a diagram illustrating the hardware configuration of the test apparatus 1. Also, FIG. 5 is a diagram illustrating the hardware configuration of the information processing apparatus 2.

As illustrated in FIG. 4, the test apparatus 1 has a CPU 101 which is a processor, a memory 102, an external interface (I/O unit) 103, and a storage medium (storage) 104. The components are connected to each other via a bus 105.

The storage medium 104 stores a program 110, in a program storage area (not illustrated) within the storage medium 104, for performing processing (hereinafter also called test processing) of testing of the test object processing to be performed by each virtual machine 3.

As illustrated in FIG. 4, at the time of execution of the program 110, the CPU 101 loads the program 110 from the storage medium 104 to the memory 102, and performs the test processing cooperatively with the program 110.

The storage medium 104 has an information storage area 130 (hereinafter also called a memory unit 130) that stores information used, for instance, when test processing is performed. Also, the external interface 103 communicates with the information processing apparatus 2.

As illustrated in FIG. 5, the information processing apparatus 2 has a CPU 201 which is a processor, a memory 202, an external interface (I/O unit) 203, and a storage medium (storage) 204. The components are connected to each other via a bus 205.

The storage medium 204 stores a program 210, in a program storage area (not illustrated) within the storage medium 204, for performing test processing.

As illustrated in FIG. 5, at the time of execution of the program 210, the CPU 201 loads the program 210 from the storage medium 204 to the memory 202, and performs the test processing cooperatively with the program 210.

The storage medium 204 has an information storage area 230 (hereinafter also called a memory unit 230) that stores information used, for instance, when test processing is performed. Also, the external interface 203 communicates with the test apparatus 1.

[Software Configuration of Information Processing System]

Figure 6:
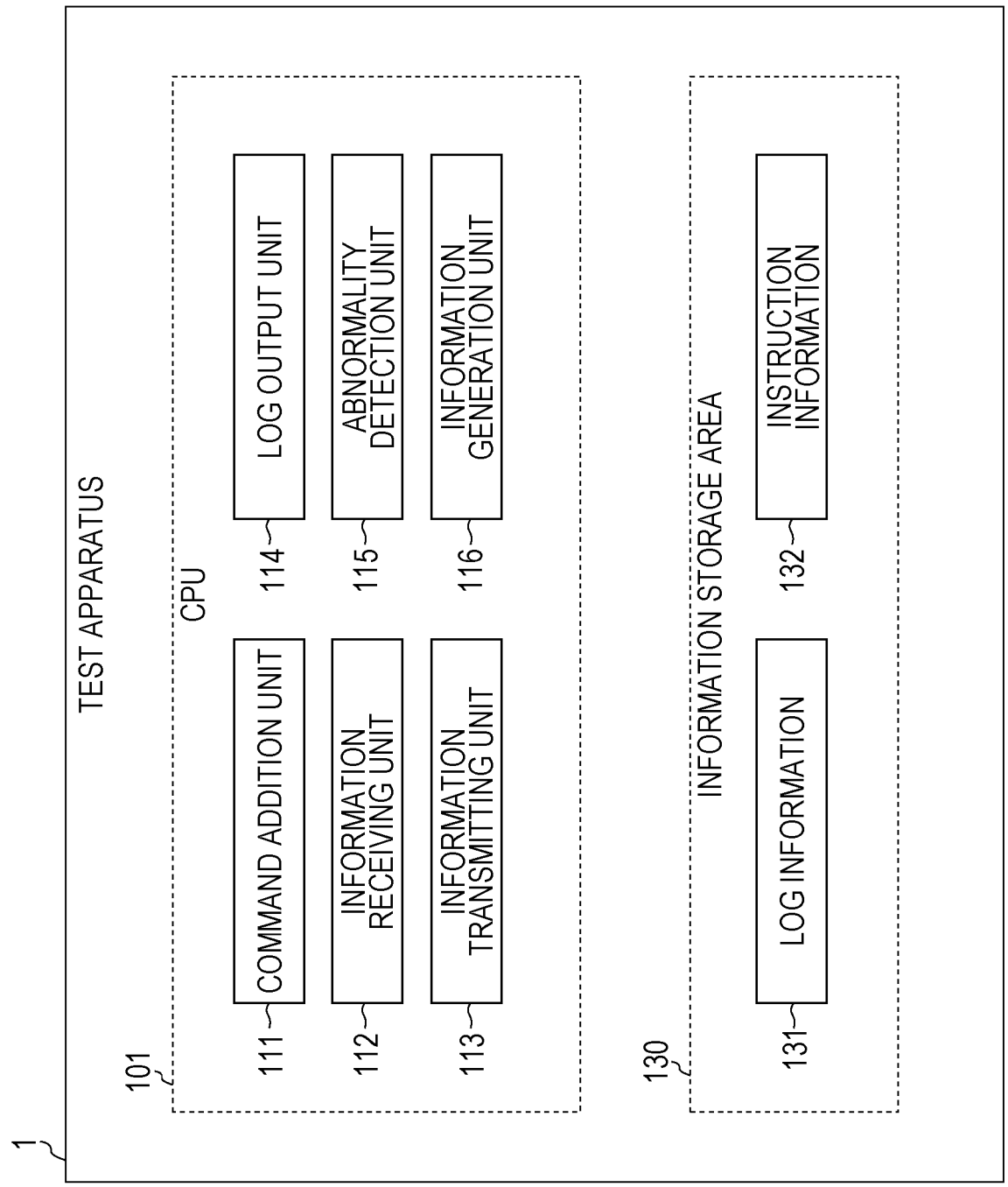
FIG. 6 is a functional block diagram of the test apparatus.

Next, the software configuration of the information processing system 10 will be described. FIG. 6 is a functional block diagram of the test apparatus 1. Also, FIG. 7 is a functional block diagram of the information processing apparatus 2.

As illustrated in FIG. 6, the CPU 101 operates as a command addition unit 111, an information receiving unit 112, an information transmitting unit 113 (hereinafter also called a processing instruction unit 113), a log output unit 114, an abnormality detection unit 115, and an information generation unit 116 by working cooperatively with the program 110. Also, as illustrated in FIG. 6, log information 131 and instruction information 132 are stored in the information storage area 130.

Figure 7:
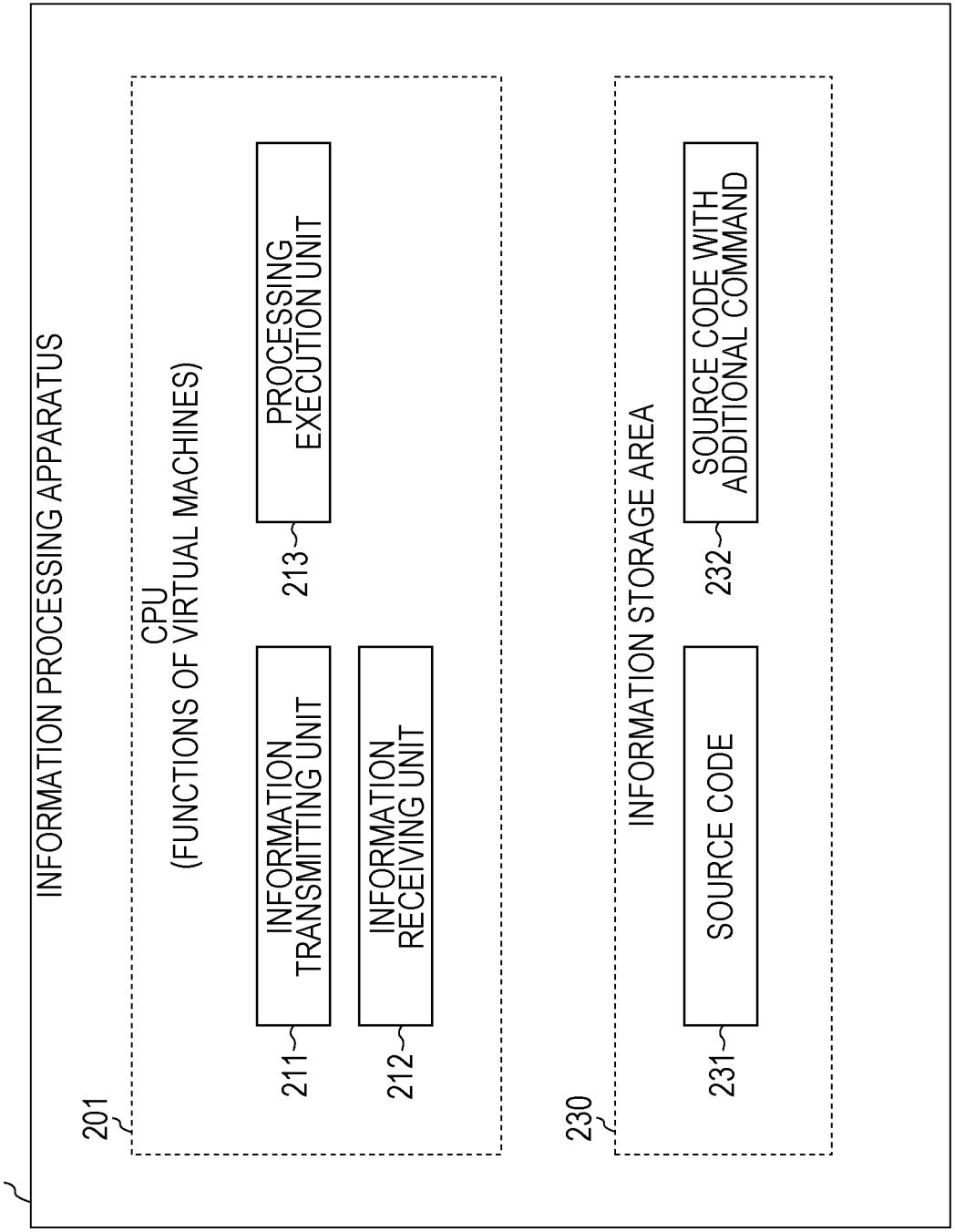
FIG. 7 is a functional block diagram of the information processing apparatus.

As illustrated in FIG. 7, the CPU 201 works cooperatively with the program 210, thereby operating as an information transmitting unit 211, an information receiving unit 212, and a processing execution unit 213, as the functions of the virtual machines 3. Also, as illustrated in FIG. 7, a source code 231 and a source code with additional command 232 are stored in the information storage area 230.

First, the function of the test apparatus 1 will be described. The command addition unit 111, which is a function of the test apparatus 1, adds an instruction request command to request an instruction from the test apparatus 1 at a predetermined position in the source code 231 of the test object processing to be performed by each of the virtual machines 3, and generates the source code with additional command 232. The predetermined position may be, for instance, before or after the position of a command to write or read data in each source code 231. Specifically, the command addition unit 111 obtains, for instance, the source code 231 stored in the information storage area 230 of the information processing apparatus 2, and generates a source code with additional command 232. The command addition unit 111 then stores, for instance, the generated source code with additional command 232 in the information storage area 230.

The information receiving unit 112, which is a function of the test apparatus 1, receives a notification from the virtual machines 3 in connection with execution of the test object processing by the virtual machines 3, the notification indicating that an instruction request command has been executed.

In response to execution of an instruction request command in one of the virtual machines 3, the information transmitting unit 113, which is a function of the test apparatus 1, instructs, for instance, the virtual machine 3 which has executed the instruction request command to perform processing determined at random. Specifically, in response to receiving a notification indicating that an instruction request command has been executed from one of the virtual machines 3 by the information receiving unit 112, the information transmitting unit 113 randomly determines shutdown of the virtual machine 3 or re-start of the processing which has been performed by the virtual machine 3, and transmits an instruction indicating execution of the determined processing.

In response to execution of an instruction request command in one of the virtual machines 3, the log output unit 114, which is a function of the test apparatus 1, outputs the log information 131 indicating a state of the one virtual machine 3 which has executed the instruction request command. The log output unit 114 then accumulates, for instance, the outputted log information 131 in the information storage area 130. A specific example of the log information 131 will be described later.

The abnormality detection unit 115, which is a function of the test apparatus 1, detects a predetermined abnormality occurred in the virtual machines 3 in connection with execution of the processing determined at random by the information transmitting unit 113.

When the abnormality detection unit 115 detects occurrence of a predetermined abnormality, the information generation unit 116, which is a function of the test apparatus 1, generates instruction information 132 based on the log information 131. The instruction information 132 is information by which each of the instruction request commands added to the source code with additional command 232 to be executed by the virtual machines 3 is associated with the processing performed by a corresponding one of the virtual machines 3 in connection with execution of the instruction request command, for instance. A specific example of the instruction information 132 will be described later.

Subsequently, when the test object processing is performed again by the virtual machines 3 to reproduce a predetermined abnormality, in response to execution of an instruction request command in one of the virtual machines 3, the information transmitting unit 113 refers to the instruction information 132 stored in the information storage area 130. The information transmitting unit 113 instructs a virtual machine 3 which has executed an instruction request command to perform the processing corresponding to the executed instruction request command. Specifically, in response to receiving a notification indicating that an instruction request command has been executed from one of the virtual machines 3 by the information receiving unit 112, the information transmitting unit 113 transmits an instruction indicating execution of the processing corresponding to the executed instruction request command.

Next, the function of the virtual machine 3 will be described. The information receiving unit 212, which is a function of the virtual machine 3, receives, for instance, data transmitted from another virtual machine 3.

For instance, when the information receiving unit 212 receives data transmitted from another virtual machine 3, the processing execution unit 213, which is a function of the virtual machine 3, executes the test object processing using the received data.

In response to execution of an instruction request command by the processing execution unit 213 in connection with execution of the test object processing, the information transmitting unit 211, which is a function of the virtual machine 3, transmits to the test apparatus 1 an instruction request for processing to be performed subsequently.

In response to a processing instruction request transmitted by the information transmitting unit 211, the information receiving unit 212 receives a processing instruction transmitted by the test apparatus 1. In this case, the processing execution unit 213 executes the processing corresponding to the processing instruction received by the information receiving unit 212. Specifically, the processing execution unit 213 shuts down the virtual machine 3 or re-starts the processing which has been performed by the virtual machine 3, according to the contents of the instruction received by the information receiving unit 212. Furthermore, the information transmitting unit 211 transmits data, for instance, to another virtual machine 3, the data being generated by execution of processing in the processing execution unit 213.

Summary of First Embodiment

Figure 8:
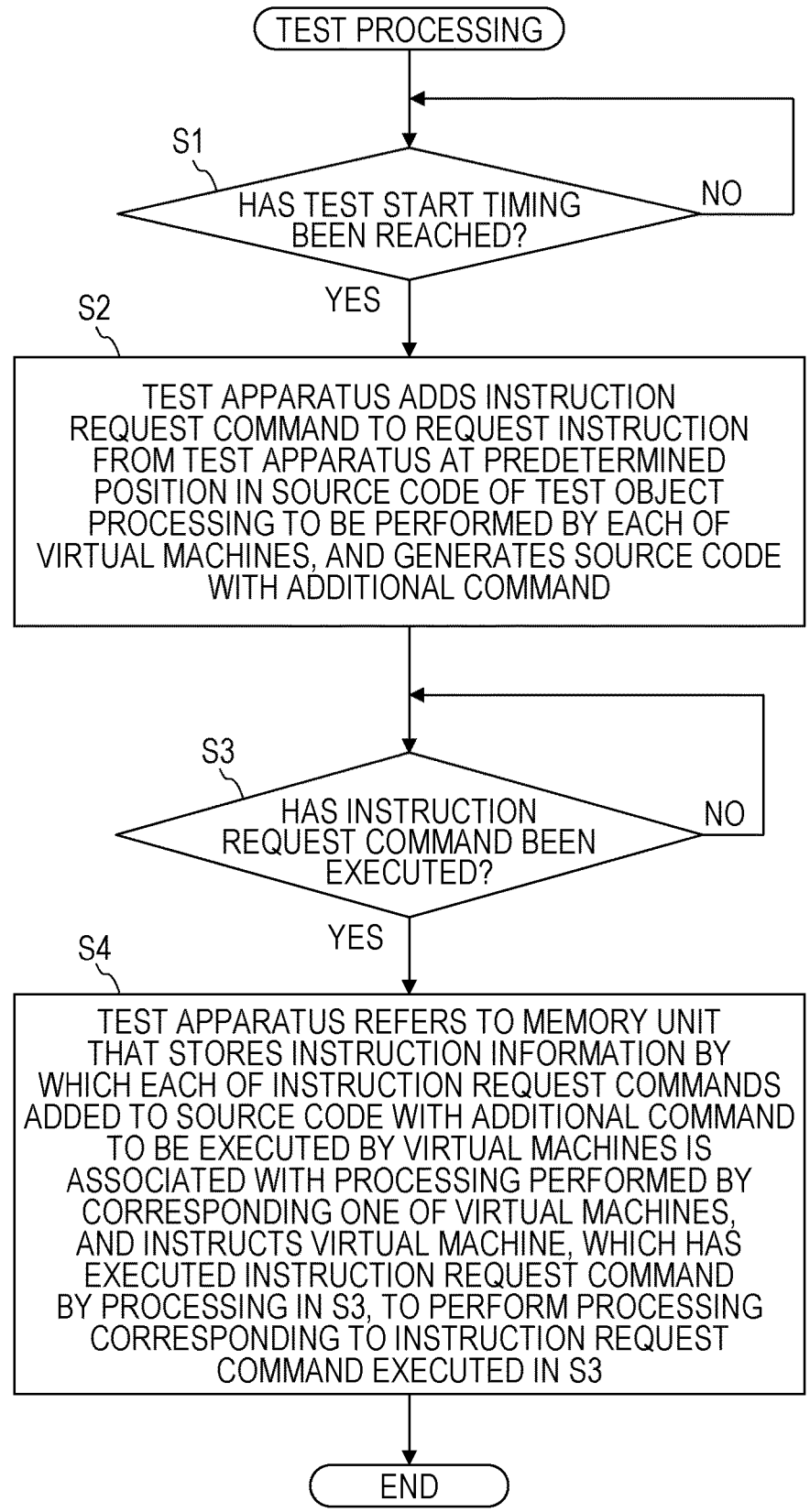
FIG. 8 is a flowchart illustrating an overview of test processing in a first embodiment.
Figure 9:
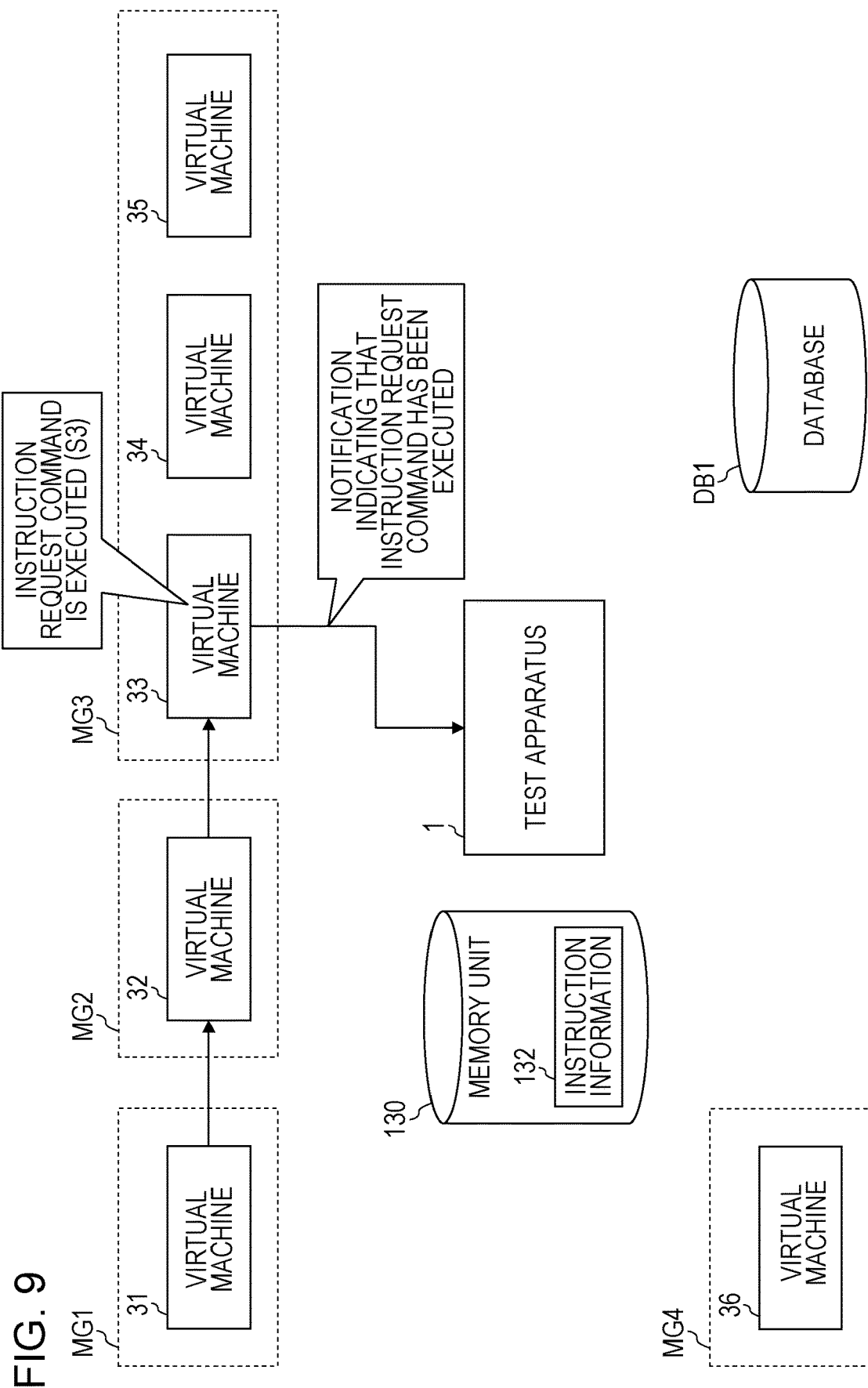
FIG. 9 is a diagram illustrating an overview of the test processing in the first embodiment.
Figure 10:
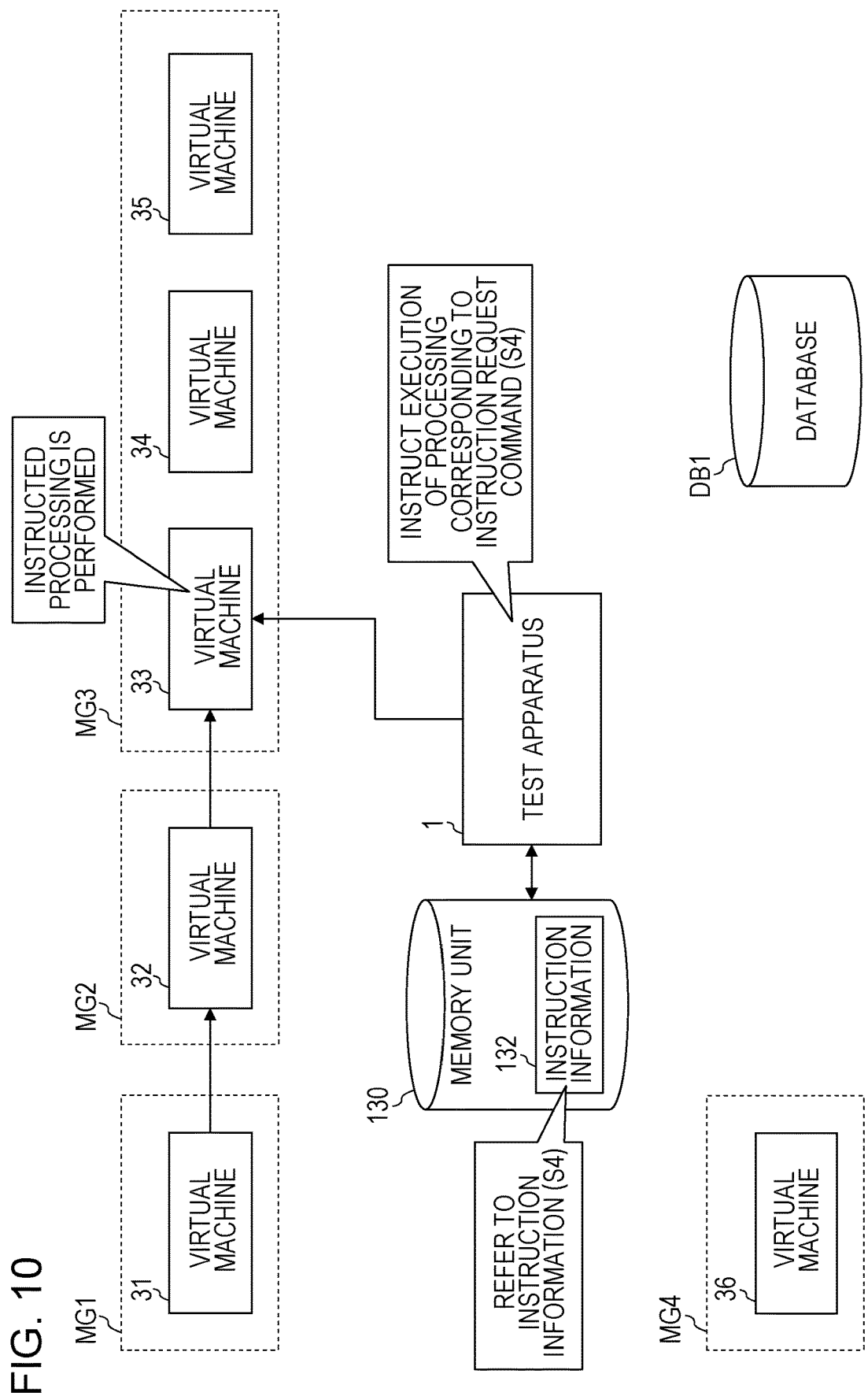
FIG. 10 is a diagram illustrating an overview of the test processing in the first embodiment.

Next, a summary of the first embodiment will be described. FIG. 8 is a flowchart illustrating an overview of the test processing in the first embodiment. FIGS. 9 and 10 are each a diagram illustrating an overview of the test processing in the first embodiment. The test processing illustrated in FIG. 8 will be described with reference to FIGS. 9 and 10.

As illustrated in FIG. 8, the test apparatus 1 stays in stand-by until test start timing is reached (NO in S1). The test start timing may be, for instance, timing of input of starting a test of test object processing to the test apparatus 1 by a business enterprise.

When the test start timing is reached (YES in S1), the test apparatus 1 adds an instruction request command to request an instruction from the test apparatus 1 at a predetermined position in the source code 231 of the test object processing to be performed by each of the virtual machines 3, and generates a source code with additional command 232 (S2). A predetermined position may be, for instance in each source code 231 before and behind the position of the command which performs writing and reading of data.

Subsequently, the test apparatus 1 stays in stand-by until an instruction request command is executed in one of the virtual machines 3 (NO in S3). In other words, the test apparatus 1 stays in stand-by until execution of the test object processing is started in the virtual machines 3, and an instruction request command is executed in one of the virtual machines 3.

When an instruction request command is executed (YES in S3), the test apparatus 1 refers to the memory unit that stores the instruction information 132 by which each of the instruction request commands added to the source code with additional command 232 to be executed by the virtual machines 3 is associated with the processing performed by a corresponding one of the virtual machines 3, and instructs a virtual machine 3, which has executed an instruction request command by the processing in S3, to perform the processing corresponding to the instruction request command executed by the processing in S3 (S4).

Specifically, as illustrated in FIG. 9, for instance, when an instruction request command is executed in the virtual machine 33, the test apparatus 1 receives a notification (a notification indicating that the instruction request command has been executed) transmitted by the virtual machine 33. In this case, as illustrated in FIG. 10, the test apparatus 1 refers to the instruction information 132 stored in the information storage area 130, and identifies the processing corresponding to the instruction request command executed by the processing in S3. Subsequently, the test apparatus 1 instructs the virtual machine 33 to perform the identified processing.

In other words, the test apparatus 1 in this embodiment conducts the test while shutting down a virtual machine 3 in accordance with, for instance, information on the virtual machines 3 and information indicating the timing of shutdown of the virtual machines 3 included in the instruction information 132 prepared in advance.

Thus, when detecting the presence of abnormality by conducting the test, the test apparatus 1 may reproduce the detected abnormality by conducting the test again with reference to the instruction information 132. Consequently, the test apparatus 1 may thoroughly perform investigation of the detected abnormality in the test.

Hereinafter, a case will be described, in which a plurality of virtual machines 3 included in one or more virtual machine groups perform the test object processing, however, a plurality of physical machines (a plurality of servers) included in one or more physical machine groups (one or more server groups) may perform the test object processing. Also, the test object processing may be performed in a plurality of containers generated on one of more physical machines or virtual machines.

Details of First Embodiment

Next, the details of the first embodiment will be described. FIGS. 11 to 16 are each a flowchart illustrating details of the test processing in the first embodiment. FIGS. 17A to 28 are each a diagram illustrating details of the test processing in the first embodiment. The test processing illustrated in FIGS. 11 to 16 will be described with reference to FIGS. 17A to 28. It is to be noted that hereinafter a description will be given under the assumption that the test object processing is performed in the virtual machines 3 described with reference to FIG. 2 and others.

[Command Addition Processing Performed by Test Apparatus]

Figure 11:
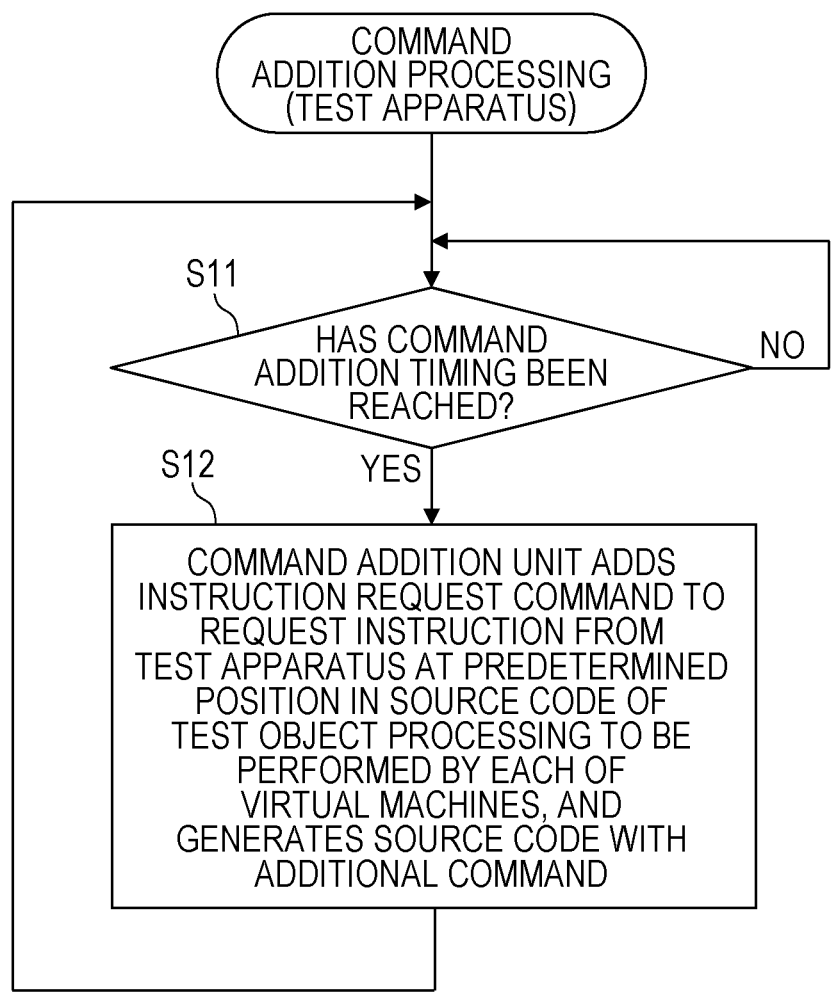
FIG. 11 is a flowchart illustrating details of the test processing in the first embodiment.

First, in the test processing performed by the test apparatus 1, the processing (hereinafter also called the command addition processing) of generating the source code with additional command 232 will be described. FIG. 11 is a flowchart illustrating the command addition processing performed by the test apparatus 1.

The command addition unit 111 stays in stand-by until command addition timing is reached (NO in S11). The command addition timing may be, for instance, timing of input of starting generation of the source code with additional command 232 to the test apparatus 1 by a business enterprise.

When the command addition timing is reached (YES in S11), the command addition unit 111 adds an instruction request command to request an instruction from the test apparatus 1 at a predetermined position in the source code 231 of the test object processing to be performed by each of the virtual machines 3, and generates a source code with additional command 232 (S12). Hereinafter, specific examples of the source code 231 and the source code with additional command 232 will be described.

[Specific Example of Source Code]

Figure 17A:
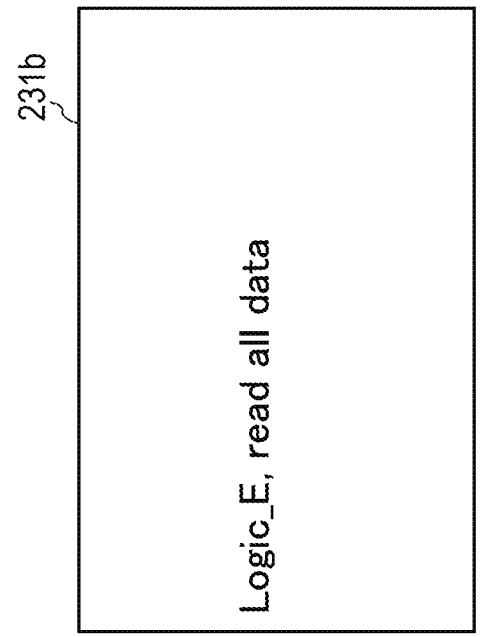
FIGS. 17A and 17B are each a chart illustrating a specific example source code.
Figure 17B:
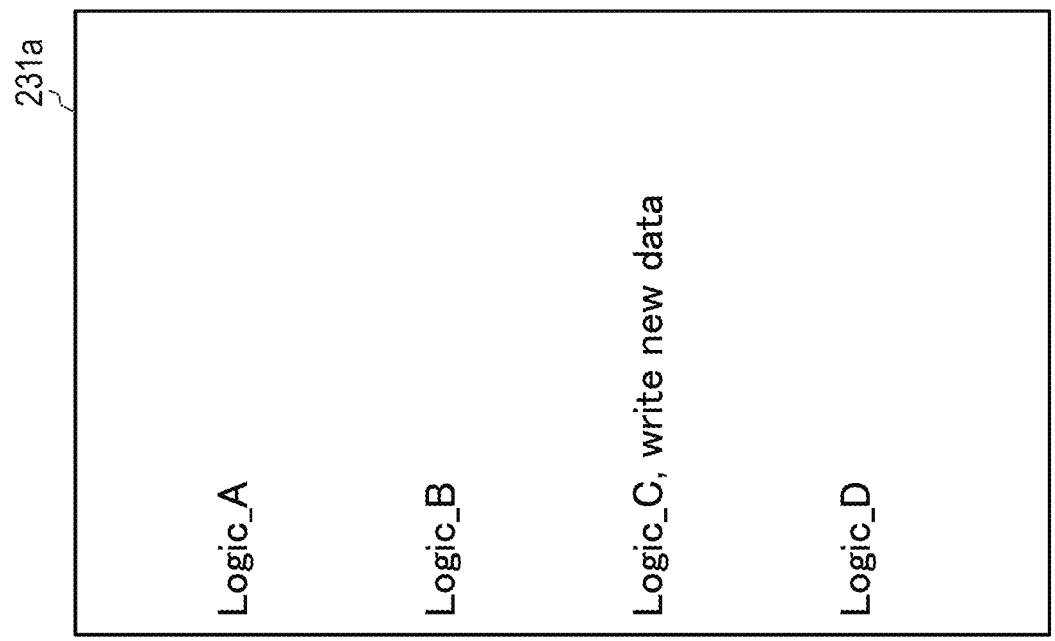

First, a specific example of the source code 231 will be described. FIGS. 17A and 17B are each a chart illustrating a specific example of the source code 231. FIG. 17A is a specific example of a source code 231a executed in the virtual machines 3 (the virtual machine 33, the virtual machine 34, and the virtual machine 35) included in the virtual machine group MG3. FIG. 17B is a specific example of a source code 231b executed in the virtual machines 3 (the virtual machine 36) included in the virtual machine group MG4.

Specifically, in the source code 231a illustrated in FIG. 17A, "Logic_A", "Logic_B", "Logic_C, write new data", and "Logic_D" are written.

In the source code 231b illustrated in FIG. 17B, "Logic_E, read new data" is written.

[Specific Example of Source Code with Addition]

Next, a specific example of the source code with additional command 232 will be described. FIGS. 18A and 18B are each a chart illustrating a specific example of the source code with additional command 232. FIG. 18A is a specific example of a source code with additional command 232a executed in the virtual machines 3 (the virtual machine 33, the virtual machine 34, and the virtual machine 35) included in the virtual machine group MG3. FIG. 18B is a specific example of a source code with additional command 232b executed in the virtual machines 3 (the virtual machine 36) included in the virtual machine group MG4.

In contrast to the source code 231a described with reference to FIG. 17A, in the source code with additional command 232a illustrated in FIG. 18A, an instruction request command is added before and after each command.

Specifically, in the source code with additional command 232a illustrated in FIG. 18A, for instance, "If (listen_31) {Exit(1);}" is written before "Logic_A". Also, in the source code with additional command 232a illustrated in FIG. 18A, for instance, "If (listen_32) {Exit(2);}" is written between "Logic_A" and "Logic_B". A description of other commands included in FIG. 18A will be omitted.

In the source code with additional command 232a illustrated in FIG. 18B, "If (listen_41) {Exit(1);}" is written before "Logic_E, read new data". Also, in the source code with additional command 232a illustrated in FIG. 18B, "If (listen_42) {Exit(2);}" is written after "Logic_E, read new data".

[Test Processing Performed by Virtual Machines]

Figure 12:
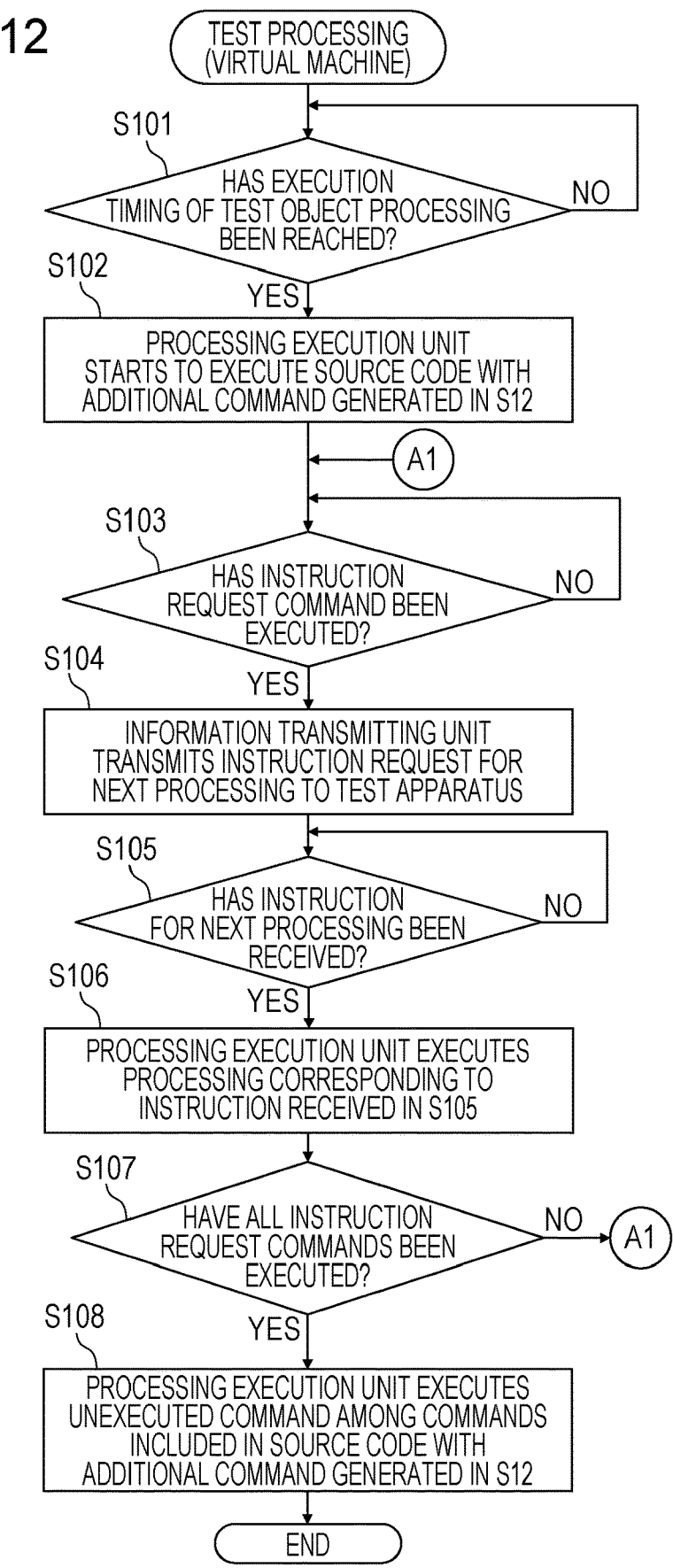
FIG. 12 is a flowchart illustrating details of the test processing in the first embodiment.

Next, the test processing performed by the virtual machines 3 will be described. FIG. 12 is a flowchart illustrating the test processing performed by the virtual machines 3.

The processing execution unit 213 stays in stand-by until execution timing of the test object processing is reached (NO in S101). Specifically, the execution timing of the test object processing is, for instance, the timing of receiving data from a virtual machine 3 that performs the processing in the preceding stage in the test object processing. When the execution timing of the test object processing is reached (YES in S101), the processing execution unit 213 starts to execute the source code with additional command 232 generated by the processing in S12 (S102).

Subsequently, the information transmitting unit 211 stays in stand-by until an instruction request command among the commands included in the source code with additional command 232 is executed (NO in S103). When an instruction request command is executed (YES in S103), the information transmitting unit 211 transmits an instruction request for the next processing to the test apparatus 1 (S104).

Subsequently, the information receiving unit 212 stays in stand-by until an instruction for the next processing is received from the test apparatus 1 (NO in S105). When an instruction for the next processing is received (YES in S105), the processing execution unit 213 executes the processing corresponding to the instruction received by the processing in S105 (S106).

That is, every time each virtual machine 3 executes an instruction request command, the test apparatus 1 in this embodiment determines processing to be executed next by the virtual machine 3. Thus, the test apparatus 1 may control the state of each virtual machine 3 during execution of the test object processing.

Furthermore, the processing execution unit 213 determines whether or not all instruction request commands included in the source code with additional command 232 have been executed (S107). As a result, when it is determined that at least one instruction request command has not been executed (NO in S107), the virtual machine 3 performs the processing in and after S103 again. On the other hand, when it is determined that all instruction request commands have been executed (YES in S107), the processing execution unit 213 executes an unexecuted command among the commands included in the source code with additional command 232 generated by the processing in S12 (S108).

[Abnormality Detection Processing Performed by Test Apparatus]

Figure 13:
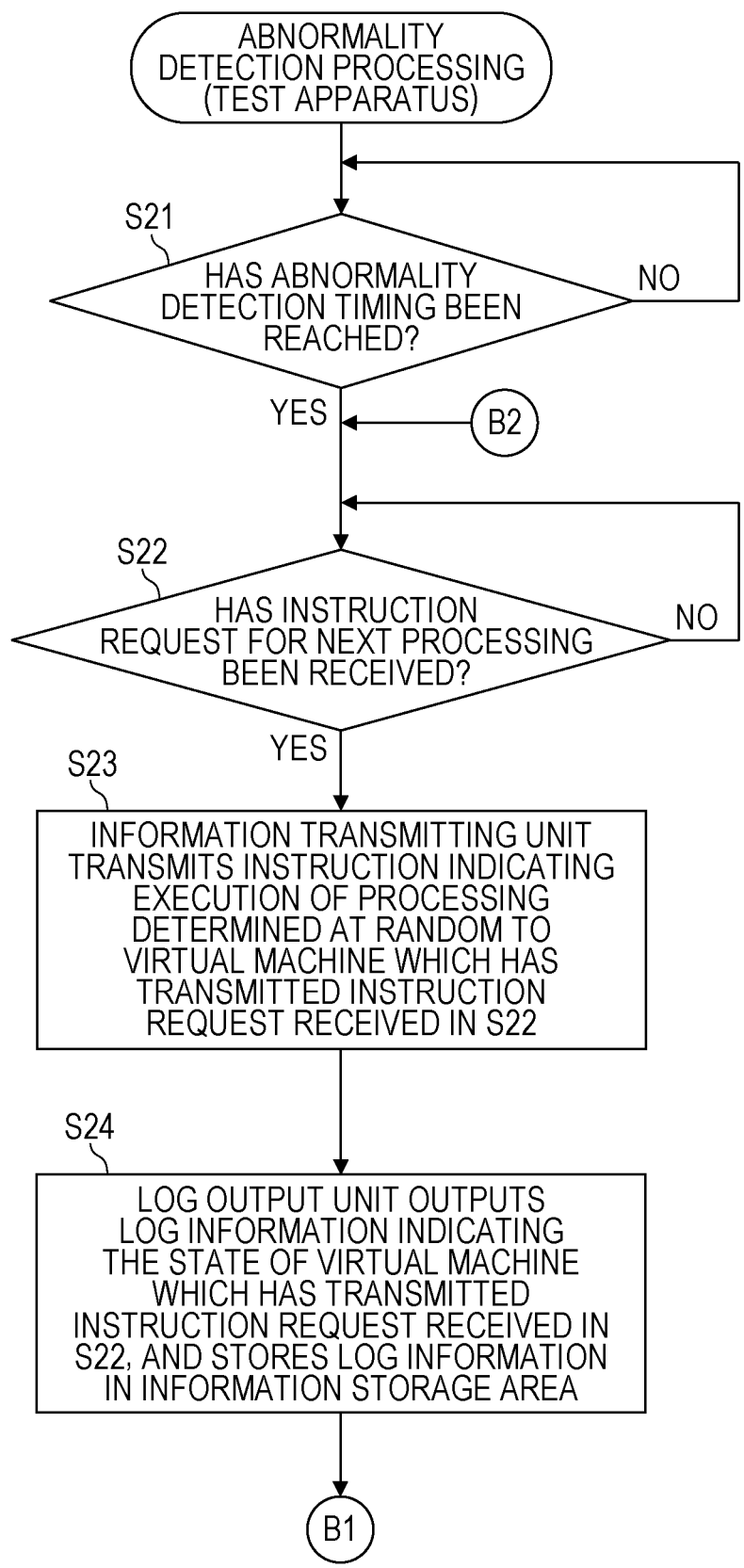
FIG. 13 is a flowchart illustrating details of the test processing in the first embodiment.
Figure 14:
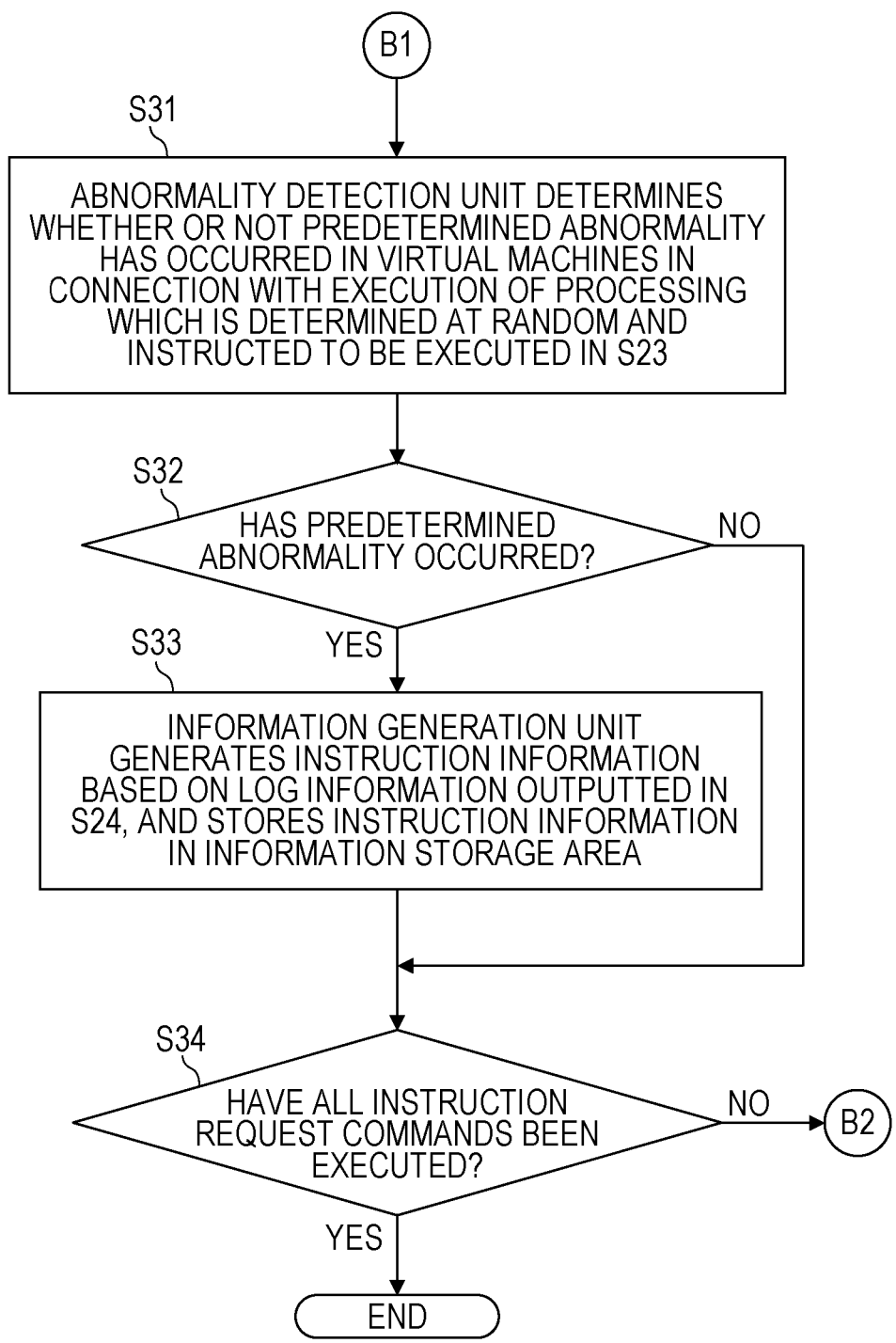
FIG. 14 is a flowchart illustrating details of the test processing in the first embodiment.

Next, in the test processing performed by the test apparatus 1, the processing of detecting an abnormality (hereinafter also called abnormality detection processing) occurred during execution of the test object processing in the virtual machines 3 will be described. FIGS. 13 and 14 are each a flowchart illustrating the abnormality detection processing performed by the test apparatus 1. The abnormality detection processing is processing that is performed while the virtual machines 3 are performing the test object processing.

The information receiving unit 112 stays in stand-by until abnormality detection timing is reached (NO in S21). The abnormality detection timing may be, for instance, timing of start of execution of the test object processing in the virtual machines 3.

When the abnormality detection timing is reached (YES in S21), the information receiving unit 112 stays in stand-by until an instruction request for the next processing is received from one of the virtual machines 3 (NO in S22). Subsequently, when an instruction request for the next processing is received (YES in S22), the information transmitting unit 113 transmits an instruction indicating execution of the processing determined at random to the one virtual machine 3 which has transmitted an instruction request received by the processing in S22 (S23). Specifically, the information transmitting unit 113 transmits an instruction indicating shut-down of the virtual machine 3 or an instruction indicating re-start of the processing which has been performed by the virtual machine 3.

Furthermore, the log output unit 114 outputs log information 131 indicating the state of the virtual machine 3 which has transmitted the instruction request received by the processing in S22, and stores the log information 131 in the information storage area 130 (S24). Hereinafter, a specific example of the log information 131 will be described.

[Specific Example of Log Information]

FIG. 19 is a table illustrating a specific example of the log information 131. As the items, the log information 131 illustrated in FIG. 19 has an "item number" that identifies each piece of information included in the log information 131, "date and time" indicating the date and time at which the processing in S24 was performed, and a "virtual machine group" that identifies a virtual machine group including the virtual machine 3 which has performed the processing in S24. In addition, as the items, the log information 131 illustrated in FIG. 19 has a "virtual machine" that identifies the virtual machine 3 which has performed the processing in S24, a "notification position" that identifies an executed instruction request command, and a "processing state" indicating the processing performed by the virtual machine 3 which has performed the processing in S24.

It is to be noted that the "processing state" is set to one of "shut-down" and "re-start", the shut-down indicating that an instruction to shut-down a virtual machine 3 has been transmitted to the virtual machine 3 by the processing in S23, the re-start indicating that an instruction to re-start a virtual machine 3 has been transmitted to the virtual machine 3 by the processing in S23.

Also, in the log information 131 illustrated in FIG. 19, "1" to "5" set in the "notification position" in the information with "VM33", "VM34", and "VM35" set in the "virtual machine" correspond to "If (listen_31) {Exit(1);}", "If (listen_32) {Exit(2);}", "If (listen_33) {Exit(3);}", "If (listen_34) {Exit(4);}", and "If (listen_35) {Exit(5);}", respectively in the source code with additional command 232a described with reference to FIG. 18A. In the log information 131 illustrated in FIG. 19, "1" and "2" set in the "notification position" in the information with "VM36" set in the "virtual machine" correspond to "If (listen_41) {Exit(1);}" and "If (listen_42) {Exit(2);}", respectively in the source code with additional command 232b described with reference to FIG. 18B.

Specifically, in the log information 131 illustrated in FIG. 19, in the information with the "item number" of "1", "2017/2/7 13:45:01" is set as the "date and time", "MG3" is set as the "virtual machine group", and "VM33" is set as the "virtual machine". In addition, in the log information 131 illustrated in FIG. 19, in the information with the "item number" of "1", "1" is set as the "notification position", and "re-start" is set as the "processing state".

Also, in the log information 131 illustrated in FIG. 19, in the information with the "item number" of "2", "2017/2/7 13:45:02" is set as the "date and time", "MG3" is set as the "virtual machine group", and "VM33" is set as the "virtual machine". In addition, in the log information 131 illustrated in FIG. 19, in the information with the "item number" of "2", "2" is set as the "notification position", and "shut-down" is set as the "processing state". A description of other information included in FIG. 19 will be omitted.

That is, the log information 131 illustrated in FIG. 19 indicates that the virtual machine 33 was shut down after the processing up to "If (listen_32) {Exit(2);}" in the source code with additional command 232a had been performed, and the virtual machine 34 was shut down after the processing up to "If (listen_34) {Exit(4);}" in the source code with additional command 232a had been performed.

Returning to FIG. 14, the abnormality detection unit 115 determines whether or not a predetermined abnormality has occurred in the virtual machines 3 in connection with execution of the processing which is determined at random and instructed to be executed by the processing in S23 (S31). Specifically, for instance, when a message (error message) indicating an occurrence of a predetermined abnormality is outputted from the virtual machines 3, the abnormality detection unit 115 may determine that a predetermined abnormality has occurred in the virtual machines 3.

When it is determined that a predetermined abnormality has occurred in the virtual machines 3 (YES in S32), the information generation unit 116 generates instruction information 132 based on the log information 131 outputted by the processing in S24, and stores the instruction information 132 in the information storage area 130 (S33). Hereinafter, the details of the processing in S33 will be described.

[Details of Processing in S33]

Figure 15:
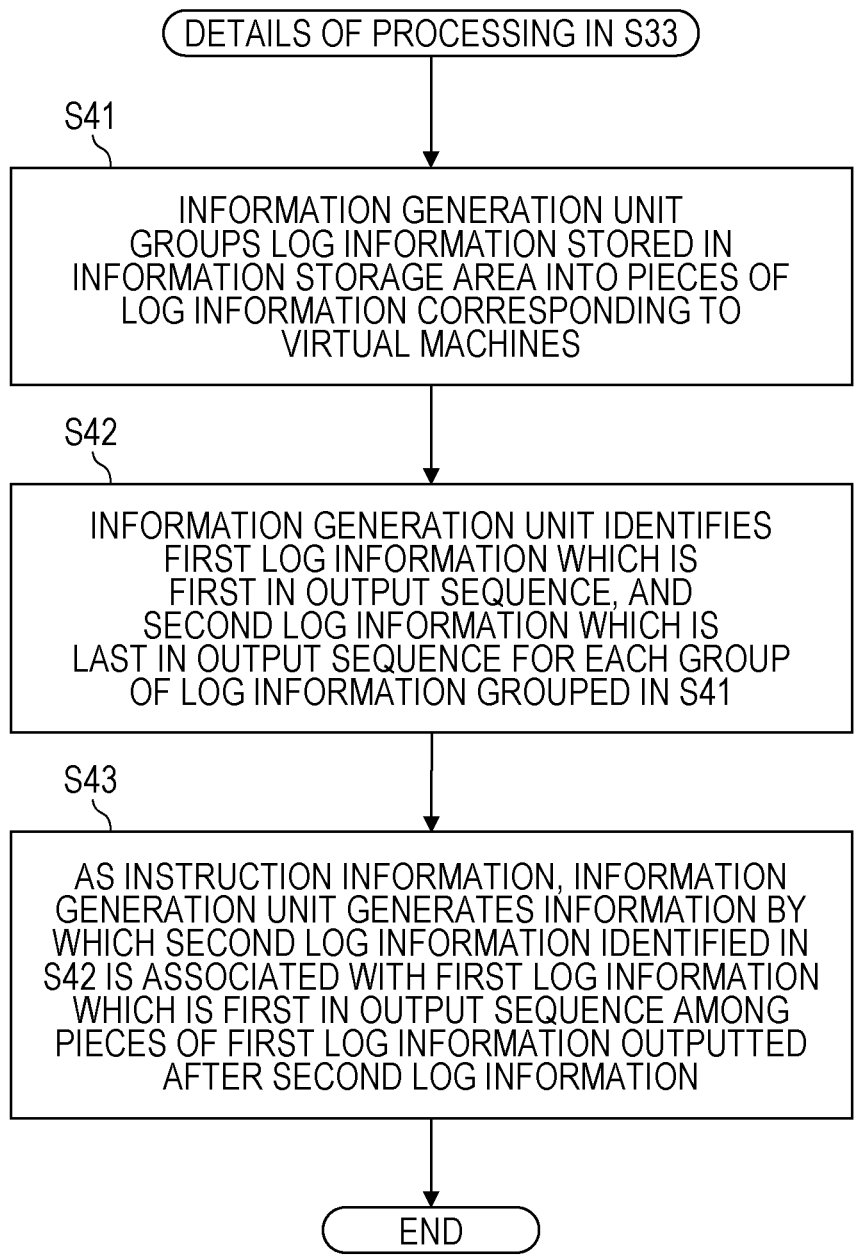
FIG. 15 is a flowchart illustrating details of the test processing in the first embodiment.

FIG. 15 is a flowchart illustrating details of the processing in S33. In addition, FIG. 20 is a flowchart illustrating details of the processing in S33.

The information generation unit 116 groups the log information 131 stored in the information storage area 130 into pieces of log information corresponding to the virtual machines 3 (S41). Specifically, the information generation unit 116 groups the log information 131 accumulated in the information storage area 130 by the processing in S24 into pieces of log information corresponding to the virtual machines 3.

For each piece of log information grouped by the processing in S41, the information generation unit 116 identifies first log information which is the first in the output sequence, and second log information which is the last in the output sequence (S42).

Specifically, as illustrated in FIG. 20, in the log information 131 described with reference to FIG. 19 for instance, the information generation unit 116 extracts the information in which "VM33" is set in the "virtual machine", and the data and time set in the "data and time" is the earliest and the latest (information with the "item number" of "1" and "2"). Also, as illustrated in FIG. 20, in the log information 131 described with reference to FIG. 19 for instance, the information generation unit 116 extracts the information in which "VM34" is set in the "virtual machine", and the data and time set in the "data and time" is the earliest and the latest (information with the "item number" of "3" and "6"). A description of other information included in FIG. 20 will be omitted.

Subsequently, as the instruction information 132, the information generation unit 116 generates information by which the second log information identified by the processing in S42 is associated with the first log information which is the first in the output sequence among the pieces of the first log information outputted after the second log information (S43). Hereinafter, a specific example of the instruction information 132 will be described.

[Specific Example of Instruction Information]

FIG. 21 is a table illustrating a specific example of the instruction information 132. As the items, the instruction information 132 illustrated in FIG. 21 has an "item number" that identifies each piece of information included in the instruction information 132, a "virtual machine group" indicating a virtual machine group, and a "notification position" indicating the position of an instruction request command in the source code with additional command 232. In addition, as the items, the instruction information 132 illustrated in FIG. 21 has an "instruction" indicating that when an instruction request command set in the "notification position" is executed, the virtual machine 3 has to be instructed, and a "condition" indicating an execution condition for the processing set in the "instruction".

Specifically, in the log information 131 illustrated in FIG. 20, the combinations of the second log information and the first log information which is the first in the output sequence among the pieces of the first log information outputted after the second log information are a combination of the information with the "item number" of "2" and the information with the "item number" of "3", a combination of the information with the "item number" of "6" and the information with the "item number" of "7", and a combination of the information with the "item number" of "11" and the information with the "item number" of "12".

Thus, for instance, as illustrated in FIG. 21, the information generation unit 116 sets "MG3", "2" and "shut-down" in the "virtual machine group", "notification position" and "instruction" in the information with the "item number" of "2" in the log information 131 described with reference to FIG. 20 to the "virtual machine group", "notification position", and "instruction", respectively in the information with the "item number" of "1". Also, as illustrated in FIG. 21, the information generation unit 116 sets "MG3", "1" and "re-start" in the "virtual machine group", "notification position", and "instruction" in the information with the "item number" of "3" in the log information 131 described with reference to FIG. 20 to the "virtual machine group", "notification position", and "instruction", respectively in the information with the "item number" of "2".

Here, in the example described with reference to FIG. 2, the virtual machine 34 is a virtual machine 3 that starts processing in connection with occurrence of shut-down of the virtual machine 33. Therefore, when the state described with reference to FIG. 2 is reproduced, shut-down of the virtual machine 33 has to be performed before the re-start of processing in the virtual machine 34. Thus, for instance, as illustrated in FIG. 21, the information generation unit 116 sets "1" which indicates that after the instruction corresponding to the information with the "item number" of "1" is executed on the "condition" of the information with the "item number" of "2", the instruction corresponding to the information with the "item number" of "2" is executed.

In other words, in the instruction information 132, the information generation unit 116 includes information indicating execution timing of processing other than normal processing (for instance, shut-down of a virtual machine), and information indicating execution timing of processing which has to be performed immediately after the processing other than normal processing is performed. Thus, the test apparatus 1 refers to the instruction information 132, and performs each processing at the same time as in the case where an abnormality occurred in the past, thereby making it possible to reproduce the state in which an abnormality occurred in the past.

In contrast, shut-down of the virtual machine 33 is not such processing that is performed in connection with assuming a specific state of another virtual machine 3. Therefore, for instance, as illustrated in FIG. 21, the information generation unit 116 sets "none" indicating there is no execution condition to "condition" in the information with the "item number" of "1". A description of other information included in FIG. 21 will be omitted.

Returning to FIG. 14, the processing execution unit 213 determines whether or not all instruction request commands included in the source code with additional command 232 (S34) have been executed.

As a result, when it is determined that at least one instruction request command has not been executed (NO in S34), the test apparatus 1 performs the processing in and after S22 again. On the other hand, when it is determined that all instruction request commands have been executed (YES in S34), the test apparatus 1 completes the abnormality detection processing.

Thus, when an abnormality occurs during execution of the test object processing, the test apparatus 1 may store the contents of the instruction provided to the virtual machines 3 by the test apparatus 1 as the instruction information 132. Consequently, as described later, the test apparatus 1 may reproduce each abnormality which has occurred by referring to the instruction information 132.

[Abnormality Reproduction Processing Performed by Test Apparatus]

Figure 16:
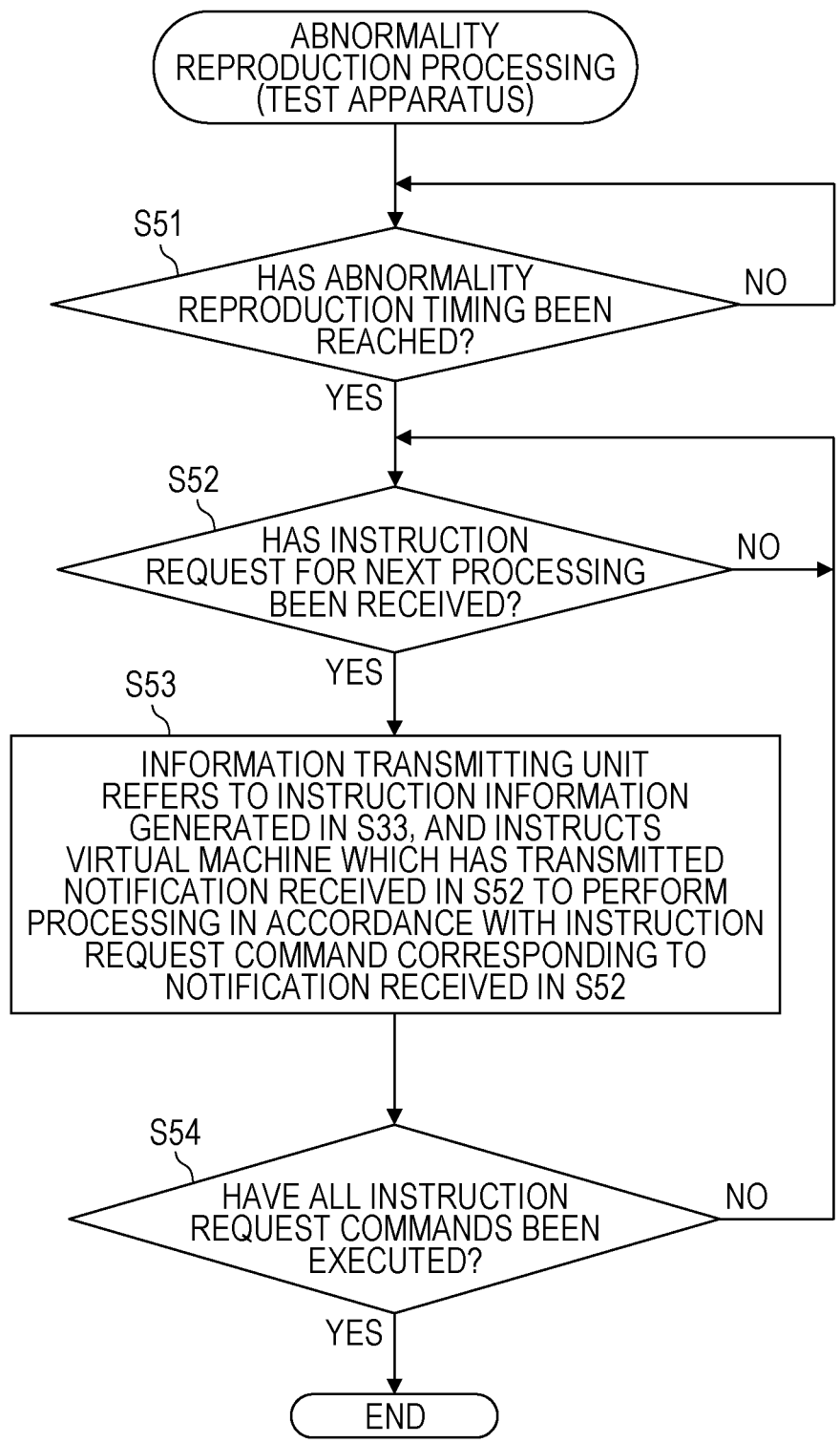
FIG. 16 is a flowchart illustrating details of the test processing in the first embodiment.

Next, in the test processing performed by the test apparatus 1, the processing of reproducing an abnormality (hereinafter also called abnormality reproduction processing) detected in the abnormality detection processing will be described. FIG. 16 is a flowchart illustrating the abnormality reproduction processing performed by the test apparatus 1. The abnormality reproduction processing is processing that is performed while the virtual machines 3 are performing the test object processing. That is, in order for the test apparatus 1 to perform the abnormality detection processing and the abnormality reproduction processing, the virtual machines 3 have to perform the test object processing multiple times.

The information receiving unit 112 stays in stand-by until abnormality reproduction timing is reached (NO in S51). The abnormality reproduction timing may be, for instance, timing of start of execution of the test object processing in the virtual machines 3.

Subsequently, when the abnormality reproduction timing is reached (YES in S51), the information receiving unit 112 stays in stand-by until an instruction request for the next processing is received from one of the virtual machines 3 (NO in S52). When an instruction request for the next processing is received (YES in S52), the information transmitting unit 113 refers to the instruction information 132 generated by the processing in S33, and instructs the virtual machine 3 which has transmitted the notification received by the processing in S52 to perform the processing in accordance with the instruction request command corresponding to the notification received by the processing in S52 (S53).

That is, the information transmitting unit 113 refers to the instruction information 132, and provides an instruction at the same timing as when an abnormality is detected in the abnormality detection processing, the instruction having the same contents as the instruction provided when the abnormality is detected in the abnormality detection processing. Thus, the test apparatus 1 may reproduce each abnormality which has occurred in the abnormality detection processing.

Subsequently, the processing execution unit 213 determines whether or not all instruction request commands included in the source code with additional command 232 have been executed (S54). As a result, when it is determined that at least one instruction request command has not been executed (NO in S54), the test apparatus 1 performs the processing in and after S52 again. On the other hand, when it is determined that all instruction request commands have been executed (YES in S54), the test apparatus 1 completes the abnormality reproduction processing. Hereinafter, a specific example of the processing in S53 will be described.

[Specific Example of Processing in S53]

FIGS. 22 to 28 are each a diagram illustrating a specific example of the processing in S53. Specifically, FIGS. 22 to 28 are each a diagram illustrating a specific example when the processing in S53 is performed multiple times.

For instance, when "If (listen_31) {Exit(1);}" in the source code with additional command 232a described with reference to FIG. 18A is executed, the virtual machine 33 transmits an instruction request for the next processing to the test apparatus 1 (S104). In this case, since information corresponding to "If (listen_31) {Exit(1);}" is not present in the instruction information 132 stored in the information storage area 130, the test apparatus 1 instructs the virtual machine 33 to "re-start" the processing (S53).

Figure 22:
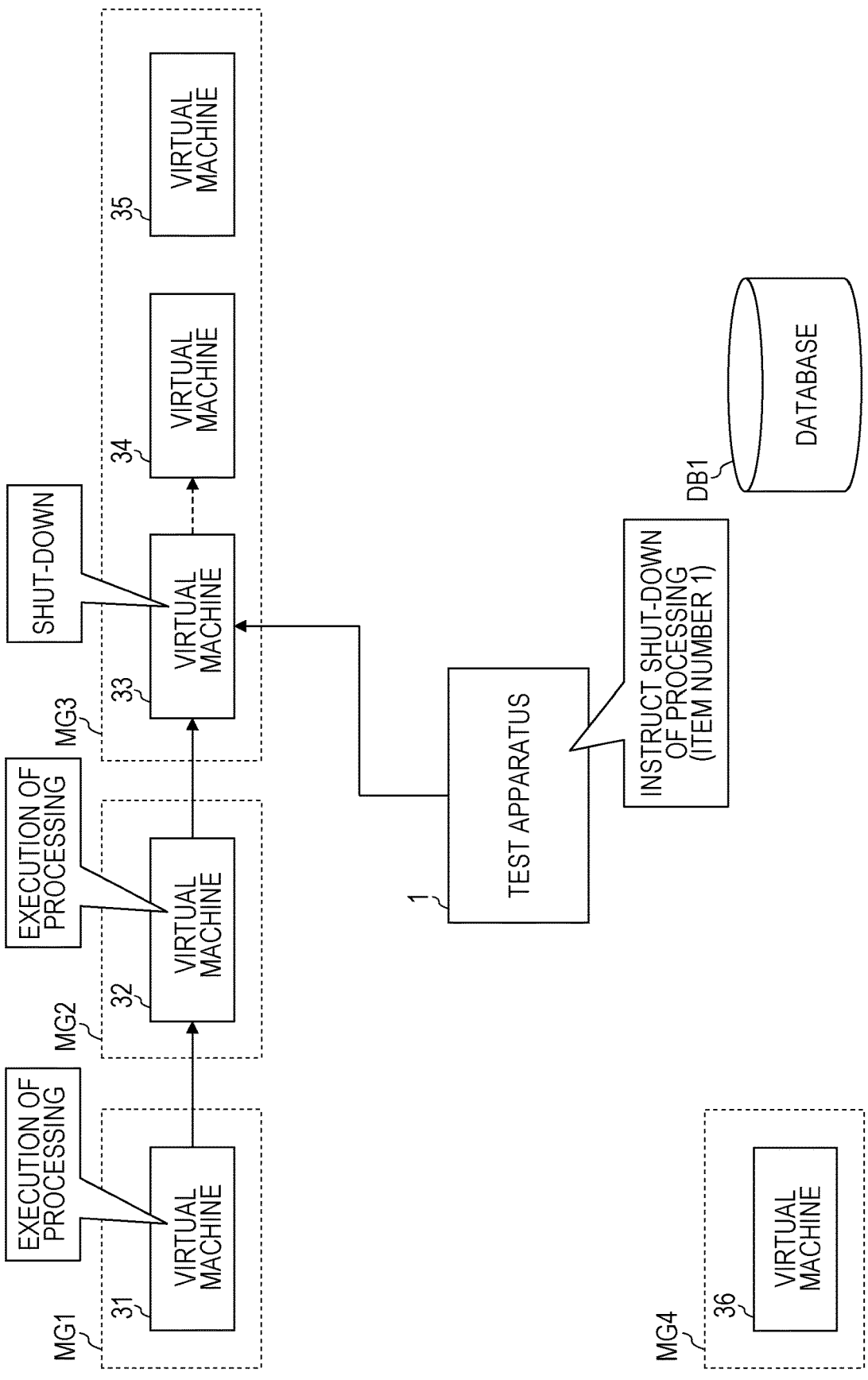
FIG. 22 is a diagram illustrating specific example processing in S53.

Subsequently, for instance, when the virtual machine 33 executes "If (listen_32) {Exit(2);}" (S104), information with the "item number" of "1" corresponding to "If (listen_32) {Exit(2);}" is present in the instruction information 132, and thus the test apparatus 1 instructs the virtual machine 33 to "shut-down" the processing as illustrated in FIG. 22 (S53).

Figure 23:
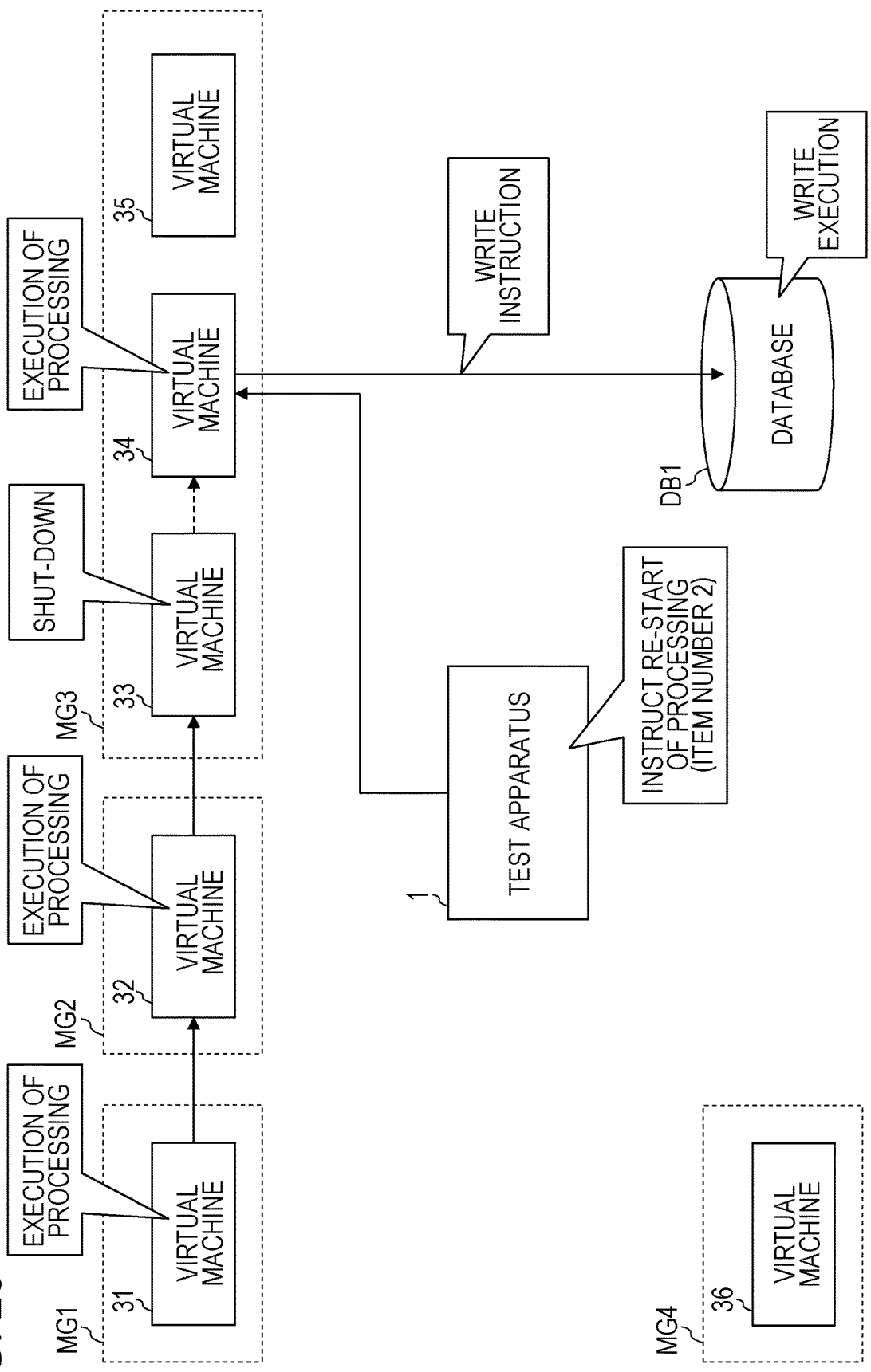
FIG. 23 is a diagram illustrating specific example processing in S53.

Subsequently, for instance, when the virtual machine 34 (the virtual machine which has started the test object processing as a replacement for the shut-down virtual machine 33) executes "If (listen_31) {Exit(1);}" (S104), information with the "item number" of "2" corresponding to "If (listen_31) {Exit(1);}" is present in the instruction information 132, and thus the test apparatus 1 instructs the virtual machine 34 to "re-start" the processing as illustrated in FIG. 23 (S53). For instance, when the virtual machine 34 executes "If (listen_33) {Exit(3);}" (S104), information corresponding to "If (listen_33) {Exit(3);}" is not present in the instruction information 132, and thus the test apparatus 1 instructs the virtual machine 33 to "re-start" the processing (S53). Therefore, as illustrated in FIG. 23, the virtual machine 34 executes "Logic_C, write new data", and writes data to the database DB1.

Figure 24:
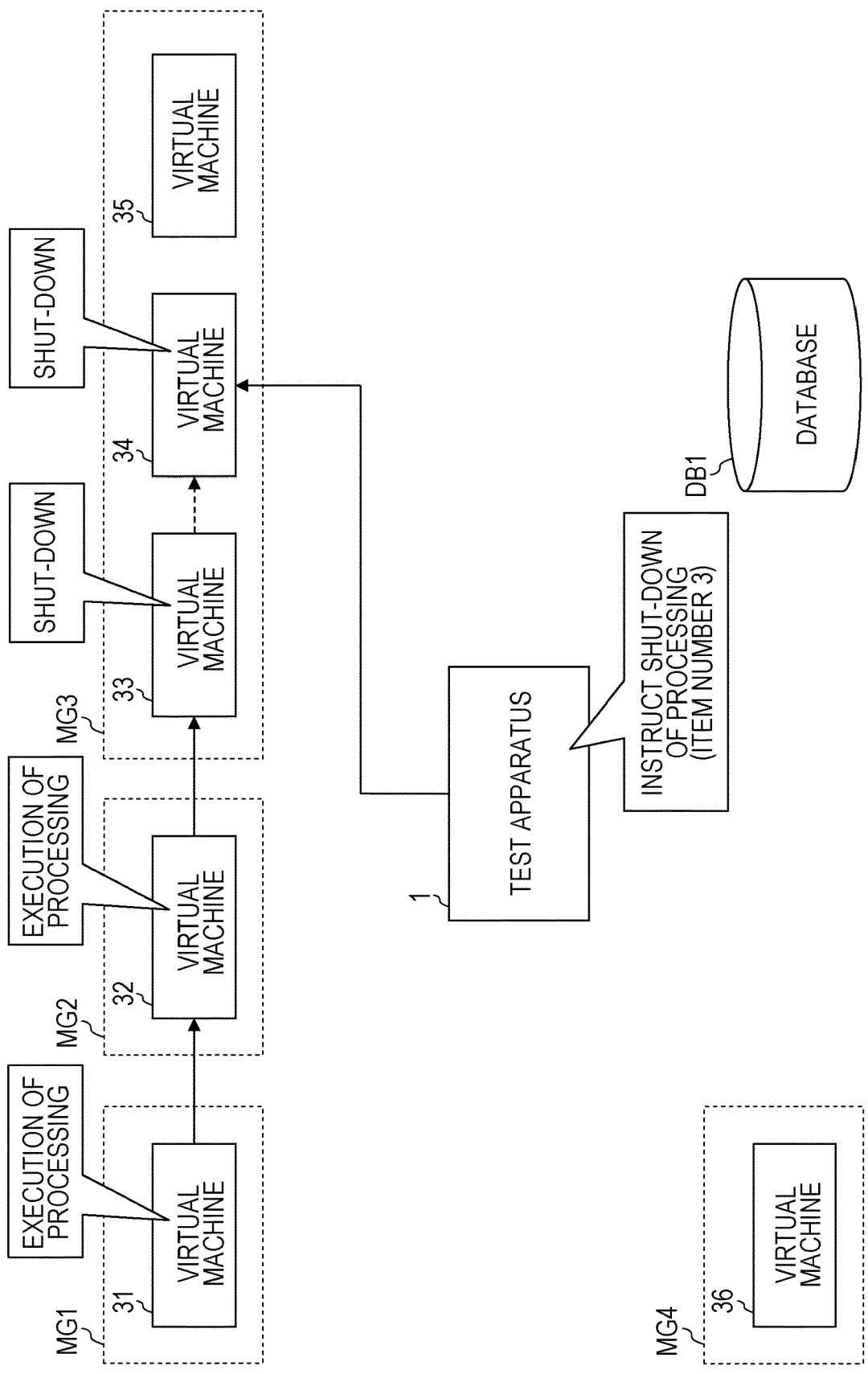
FIG. 24 is a diagram illustrating specific example processing in S53.

Furthermore, for instance, when the virtual machine 34 executes "If (listen_34) {Exit(4);}" (S104), information with the "item number" of "3" corresponding to "If (listen_34) {Exit(4);}" is present in the instruction information 132, and thus the test apparatus 1 instructs the virtual machine 33 to "shut-down" the processing as illustrated in FIG. 24 (S53).

Figure 25:
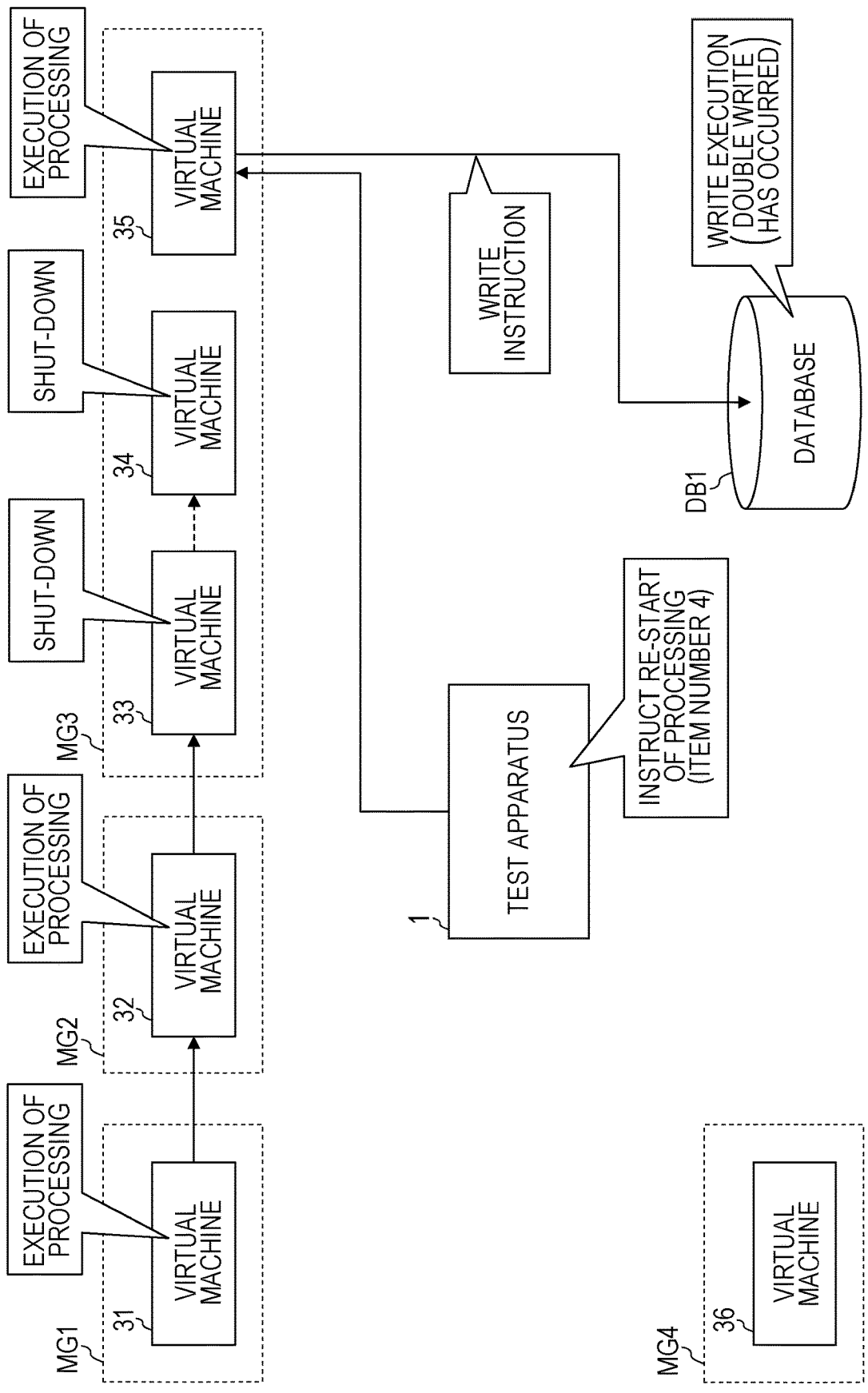
FIG. 25 is a diagram illustrating specific example processing in S53.

Subsequently, for instance, when the virtual machine 35 (the virtual machine which has started the test object processing as a replacement for the shut-down virtual machine 33) executes "If (listen_31) {Exit(1);}" (S104), information with the "item number" of "4" corresponding to "If (listen_31) {Exit(1);}" is present in the instruction information 132, and thus the test apparatus 1 instructs the virtual machine 35 to "re-start" the processing as illustrated in FIG. 25 (S53). For instance, when the virtual machine 35 executes "If (listen_33) {Exit(3);}" (S104), information corresponding to "If (listen_33) {Exit(3);}" is not present in the instruction information 132, and thus the test apparatus 1 instructs the virtual machine 33 to "re-start" the processing (S53). Therefore, as illustrated in FIG. 25, the virtual machine 35 executes "Logic_C, write new data", and writes data to the database DB1. That is, each of the virtual machine 34 and the virtual machine 35 executes "Logic_C, write new data", and thus double write of the same data is performed in the database DB1.

Figure 26:
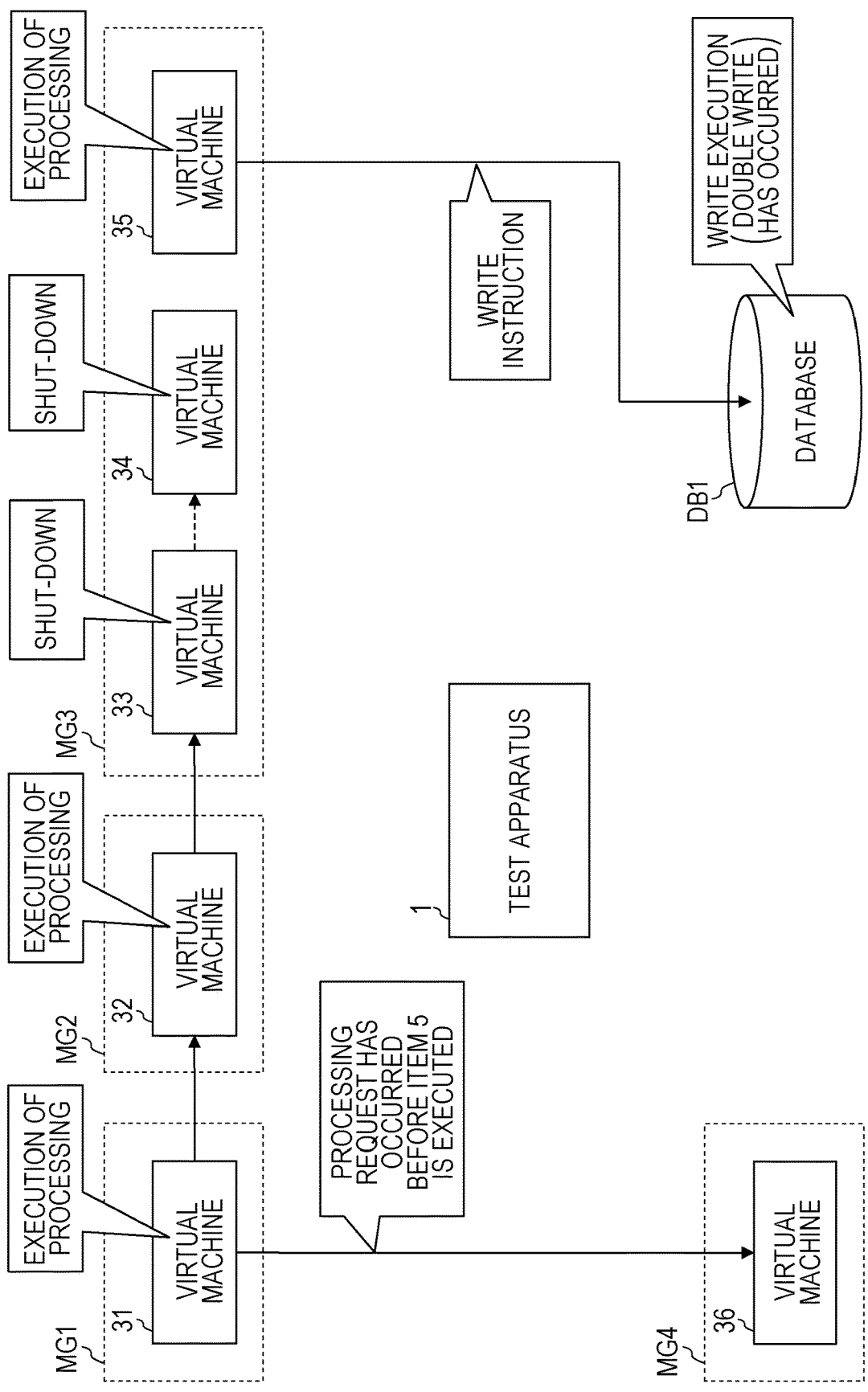
FIG. 26 is a diagram illustrating specific example processing in S53.

Subsequently, for instance, when a processing request is transmitted from the virtual machine 31 as illustrated in FIG. 26, the virtual machine 36 starts the test object processing. For instance, when "If (listen_41) {Exit(1);}" in the source code with additional command 232b described with reference to FIG. 18B is executed, the virtual machine 36 transmits an instruction request for the next processing to the test apparatus 1 (S104).

Figure 27:
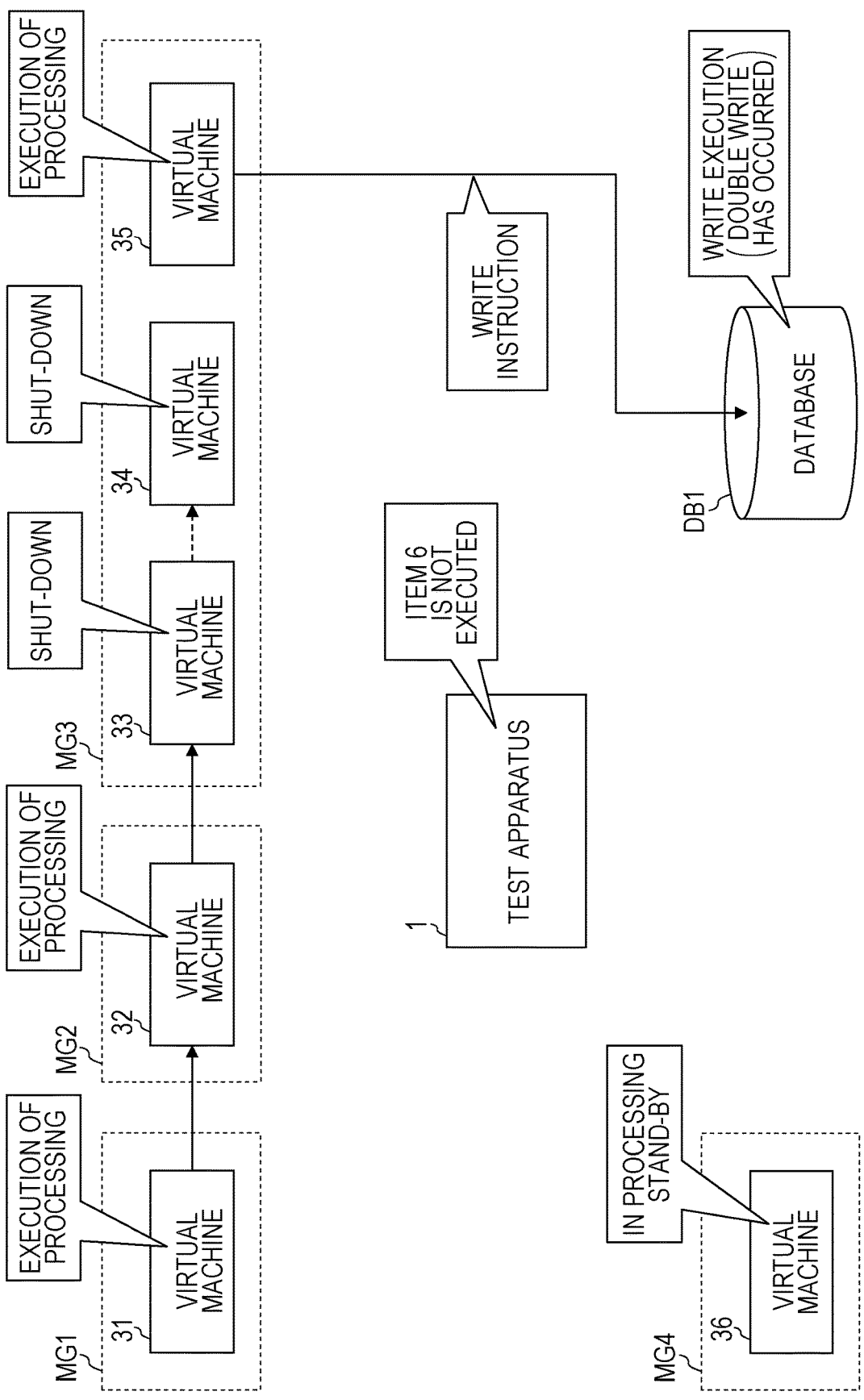
FIG. 27 is a diagram illustrating specific example processing in S53.

Here, information with the "item number" of "6" corresponding to "If (listen_41) {Exit(1);}" is present in the instruction information 132 stored in the information storage area 130. However, in the example illustrated in FIG. 26, "If (listen_35) {Exit(5);}" is not executed by one of the virtual machines 3 included in the virtual machine group MG3, and thus the execution condition set in the "condition" of the information with the "item number" of "6" in the instruction information 132 is not satisfied. In this case, as illustrated in FIG. 27, the test apparatus 1 stays in stand-by without performing the instruction (an instruction to the virtual machine 36, indicating "re-start" of the processing) corresponding to the information with the "item number" of "6" in the instruction information 132.

Figure 28:
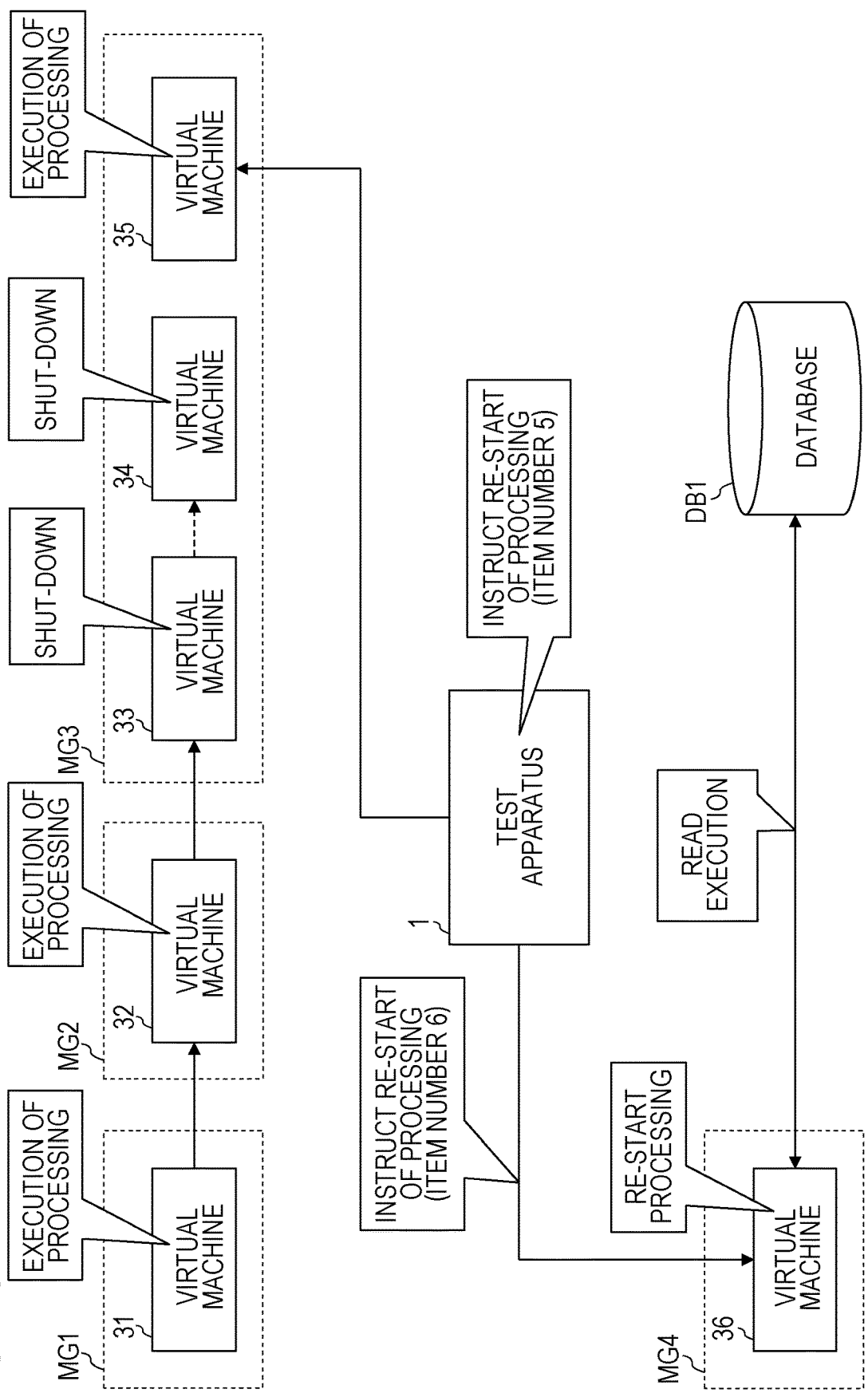
FIG. 28 is a diagram illustrating specific example processing in S53.

Subsequently, for instance, when the virtual machine 35 executes "If (listen_35) {Exit(5);}" (S104), information with the "item number" of "5" corresponding to "If (listen_35) {Exit(5);}" is present in the instruction information 132, and thus the test apparatus 1 instructs the virtual machine 35 to "re-start" the processing as illustrated in FIG. 28 (S53).

In this case, the execution condition set in the "condition" of the information with the "item number" of "6" in the instruction information 132 is satisfied, and thus the test apparatus 1 provides the instruction corresponding to the information with the "item number" of "6" in the instruction information 132 as illustrated in FIG. 28. Thus, the virtual machine 36 executes "Logic_E, read new data", and reads the data stored in the database DB1 as illustrated in FIG. 28. Subsequently, in this case, the virtual machine 36 detects double write of the same data in the database DB1, and for instance, notifies the test apparatus 1 of occurrence of abnormality.

Consequently, the test apparatus 1 may reproduce each abnormality detected in the abnormality detection processing by referring to the instruction information 132.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A test apparatus that tests specific processing performed by a plurality of computing machine resources in coordination with each other, the computing machine resources provided by one or a plurality of computers, the test apparatus comprising:
a memory; and
a processor coupled to the memory and configured to:
add an instruction request command to request an instruction from the test apparatus at a predetermined position in a source code of the specific processing performed by each of the plurality of computing machine resources, and generate the source code with an additional command, and
in response to execution of the instruction request command in one of the plurality of computing machine resources during execution of the specific processing, refer to the memory that stores instruction information by which the instruction request command added to the source code with the additional command executed by each of the plurality of computing machine resources is associated with processing performed by the computing machine resource, and instruct the one of the plurality of computing machine resources which has executed the instruction request command to perform the processing corresponding to the executed instruction request command,
wherein in response to execution of the instruction request command by one of the plurality of computing machine resources during execution of pre-processing of the specific processing performed before the specific processing is performed, the processor instructs the one of the plurality of computing machine resources which has executed the instruction request command to perform processing determined at random; and
the processor is further configured to:
in response to execution of the instruction request command by the one of the plurality of computing machine resources, output log information indicating a state of the one computing machine resource,
detect a predetermined abnormality which has occurred in the plurality of computing machine resources when the processing determined at random is performed, and
upon detection of an occurrence of the predetermined abnormality, generate the instruction information based on the log information, wherein:
the instruction information is information by which the instruction request command added to the source code with the additional command executed by each of the plurality of computing machine resources, the processing performed by the computing machine resource, and a predetermined condition are associated with each other; and
when the predetermined condition is satisfied, the processor provides an instruction to perform the processing corresponding to the executed instruction request command.

2. The test apparatus according to claim 1,
wherein the instruction request command is a command to request an instruction of processing subsequently performed by each of the plurality of computing machine resources.

3. The test apparatus according to claim 1,
wherein the predetermined condition is that predetermined processing is performed by a specific computing machine resource which is among the plurality of computing machine resources and other than a computing machine resource to which an instruction to perform the processing is provided by the processor.

4. The test apparatus according to claim 1,
wherein when the processing corresponding to the executed instruction request command in the instruction information is a re-start of processing in a computing machine resource, the processor instructs the computing machine resource which has executed the instruction request command to re-start the processing.

5. The test apparatus according to claim 1, wherein
the processor is further configured to:
receive notification from each of the plurality of computing machine resources, the notification indicating that the instruction request command has been executed, and
in response to receiving the notification, refer to the instruction information.

6. The test apparatus according to claim 1,
wherein the processor adds the instruction request command before or after a command for reading or writing data among commands included in the source code.

7. The test apparatus according to claim 1, wherein the processor:
groups the log information into pieces of log information corresponding to the plurality of computing machine resources;
identifies first log information which is a first in an output sequence and second log information which is a last in the output sequence for each grouped piece of log information; and
generates, as the instruction information, information by which each identified second log information is associated with first log information which is first in the output sequence out of pieces of the first log information outputted after the second log information.

8. A test apparatus that tests specific processing performed by a plurality of computing machine resources in coordination with each other, the computing machine resources provided by one or a plurality of computers, the test apparatus comprising:
a memory; and
a processor coupled to the memory and configured to:
add an instruction request command to request an instruction from the test apparatus at a predetermined position in a source code of the specific processing performed by each of the plurality of computing machine resources, and generate the source code with an additional command, and
in response to execution of the instruction request command in one of the plurality of computing machine resources during execution of the specific processing, refer to the memory that stores instruction information by which the instruction request command added to the source code with the additional command executed by each of the plurality of computing machine resources is associated with processing performed by the computing machine resource, and instruct the one of the plurality of computing machine resources which has executed the instruction request command to perform the processing corresponding to the executed instruction request command,
wherein in response to execution of the instruction request command by one of the plurality of computing machine resources during execution of pre-processing of the specific processing performed before the specific processing is performed, the processor instructs the one of the plurality of computing machine resources which has executed the instruction request command to perform processing determined at random; and
the processor is further configured to:
in response to execution of the instruction request command by the one of the plurality of computing machine resources, output log information indicating a state of the one computing machine resource,
detect a predetermined abnormality which has occurred in the plurality of computing machine resources when the processing determined at random is performed, and
upon detection of an occurrence of the predetermined abnormality, generate the instruction information based on the log information,
wherein when the processing corresponding to the executed instruction request command in the instruction information is a shut-down of a computing machine resource, the processor instructs the computing machine resource which has executed the instruction request command to shut down,
wherein when one of the plurality of computing machine resources is shut down in response to the shut-down instructed by the processor, a management apparatus, which manages the plurality of computing machine resources, causes another computing machine resource that executes a source code with additional command being the same as the source code with the additional command of the one computing machine resource to perform the processing to be performed by the one computing machine resource.

9. A method performed by a test apparatus that tests specific processing performed by a plurality of computing machine resources in coordination with each other, the computing machine resources provided by one or a plurality of computers, the method comprising:
adding an instruction request command to request an instruction from the test apparatus at a predetermined position in a source code of the specific processing performed by each of the plurality of computing machine resources, and generating a source code with an additional command; and
in response to execution of the instruction request command in one of the plurality of computing machine resources during execution of the specific processing, referring to a memory that stores instruction information by which the instruction request command added to the source code with the additional command executed by each of the plurality of computing machine resources is associated with processing performed by the computing machine resource, and instructing the one of the plurality of computing machine resources which has executed the instruction request command to perform the processing corresponding to the executed instruction request command,
wherein in response to execution of the instruction request command by one of the plurality of computing machine resources during execution of pre-processing of the specific processing performed before the specific processing is performed, instructing the one of the plurality of computing machine resources which has executed the instruction request command to perform processing determined at random; and
in response to execution of the instruction request command by the one of the plurality of computing machine resources, outputting log information indicating a state of the one computing machine resource,
detecting a predetermined abnormality which has occurred in the plurality of computing machine resources when the processing determined at random is performed, and
upon detection of an occurrence of the predetermined abnormality, generating the instruction information based on the log information, wherein:
the instruction information is information by which the instruction request command added to the source code with the additional command executed by each of the plurality of computing machine resources, the processing performed by the computing machine resource, and a predetermined condition are associated with each other; and
when the predetermined condition is satisfied, the processor provides an instruction to perform the processing corresponding to the executed instruction request command.

10. A non-transitory, computer-readable recording medium having stored therein a program for causing a computer included in a test apparatus to execute a process, the test apparatus configured to test specific processing performed by a plurality of computing machine resources in coordination with each other, the computing machine resources provided by one or a plurality of computers, the process comprising:

adding an instruction request command to request an instruction from the test apparatus at a predetermined position in a source code of the specific processing performed by each of the plurality of computing machine resources, and generating a source code with an additional command; and in response to execution of the instruction request command in one of the plurality of computing machine resources during execution of the specific processing, referring to a memory that stores instruction information by which the instruction request command added to the source code with the additional command executed by each of the plurality of computing machine resources is associated with processing performed by the computing machine resource, and instructing the one of the plurality of computing machine resources which has executed the instruction request command to perform the processing corresponding to the executed instruction request command, wherein in response to execution of the instruction request command by one of the plurality of computing machine resources during execution of pre-processing of the specific processing performed before the specific processing is performed, instructing the one of the plurality of computing machine resources which has executed the instruction request command to perform processing determined at random; and in response to execution of the instruction request command by the one of the plurality of computing machine resources, outputting log information indicating a state of the one computing machine resource, detecting a predetermined abnormality which has occurred in the plurality of computing machine resources when the processing determined at random is performed, and upon detection of an occurrence of the predetermined abnormality, generating the instruction information based on the log information, wherein:

the instruction information is information by which the instruction request command added to the source code with the additional command executed by each of the plurality of computing machine resources, the processing performed by the computing machine resource, and a predetermined condition are associated with each other; and when the predetermined condition is satisfied, the processor provides an instruction to perform the processing corresponding to the executed instruction request command.

\* \* \* \* \*